US011807330B2

(12) United States Patent
Bank

(10) Patent No.: US 11,807,330 B2
(45) Date of Patent: Nov. 7, 2023

(54) ARTICULATING FOOTRESTS FOR VEHICLES

(71) Applicant: Todd Granger Bank, Simi Valley, CA (US)

(72) Inventor: Todd Granger Bank, Simi Valley, CA (US)

( * ) Notice: Subject to any disclaimer, the term of this patent is extended or adjusted under 35 U.S.C. 154(b) by 0 days.

(21) Appl. No.: 17/369,857

(22) Filed: Jul. 7, 2021

(65) Prior Publication Data
US 2022/0017174 A1 Jan. 20, 2022

Related U.S. Application Data

(60) Provisional application No. 63/051,895, filed on Jul. 15, 2020.

(51) Int. Cl.
*B62J 25/06* (2020.01)
*B62K 19/36* (2006.01)

(52) U.S. Cl.
CPC .............. *B62J 25/06* (2020.02); *B62K 19/36* (2013.01)

(58) Field of Classification Search
CPC ........................................................ B62J 25/06
USPC ........................................................ 280/291
See application file for complete search history.

(56) References Cited

U.S. PATENT DOCUMENTS

| | | | | | |
|---|---|---|---|---|---|
| 5,090,715 | A | * | 2/1992 | Nakajima | B62J 25/04 280/166 |
| 5,826,900 | A | * | 10/1998 | Steele | B62J 25/06 182/91 |
| 7,287,773 | B1 | * | 10/2007 | Stahel | B62J 25/04 280/288.4 |
| 9,469,361 | B2 | * | 10/2016 | Mori | G05D 3/00 |
| 10,252,740 | B2 | * | 4/2019 | Pierce | B62B 17/04 |
| 11,148,751 | B2 | * | 10/2021 | Laberge | B62K 5/05 |
| 11,260,934 | B2 | * | 3/2022 | Reitinger | B62M 7/04 |
| 2020/0339210 | A1 | * | 10/2020 | Buell | B62J 1/12 |

* cited by examiner

*Primary Examiner* — Minnah L Seoh
*Assistant Examiner* — Hosam Shabara

(57) ABSTRACT

An articulating footrest mechanism pivotally attached to a vehicle that is adapted for transportation and recreation of all types. The articulating footrest mechanism has a top and bottom horizontal arm, or two top and two bottom horizontal arms pivotally attached to a vehicle frame section at footrest level and adapted to move freely in a circumferential nature around fulcrums located at midpoint of each arm. The articulating footrest mechanism includes two or four vertical footrest arms connected to the top and bottom horizontal arm ends with fasteners inserted through fulcrums that comprise of roller bearings or lubricated sleeves. Footrests such as bicycle pedals, motorcycle style pegs or ATV type platforms of any size or shape fix to the left and right vertical footrest arm or arms to support the weight of a human being thereon.

20 Claims, 11 Drawing Sheets

ARTICULATING FOOTRESTS FOR VEHICLES

BACKGROUND OF THE INVENTION

The present invention relates generally to footrests for vehicles that are similar to that of a motorcycle, bicycle, kids scooter or skibike (bicycle frame system with snow skis). More particularly, the present invention relates to articulated footrests that allow someone riding one of these types of vehicles to manually or automatically raise or lower their footrests for various important purposes, some of which are, balancing body weight when negotiating a sharp curve, having fun and looking stylish.

The above principle of footrest articulation and vehicle embodiment is well known, as is described in more than several of the issued patents discussed further below. Such vehicles utilize various methods to link the articulating footrest mechanism together and then to a vehicle, with such examples being cited in the related art discussed further below. However, the present articulating footrest invention differs from those of the prior art in that it utilizes horizontal and vertical arms with fulcrums to link the motion of the two separate footrests together so that they always articulate in unison and stay flat with the rider's foot. This is what adds excitement, style and safety to riding a vehicle with this invention attached to it at footrest level. Provided below is a discussion of the related art and its differences and distinctions from the present invention that the present inventor is aware of.

DESCRIPTION OF THE RELATED ART

There are known a number of different types of articulating footrest systems for vehicles. U.S. Pat. No. 8,128,111B2 by Zike LLC discloses a 2-wheel vehicle classified as a "bicycle without a seat" in which the articulated footrests are also foot levers that the rider operates with their hips, legs, and feet to propel the vehicle forward. Operating the footrest levers of this vehicle is very similar to how a human being uses a stair-stepping exercise device at a gymnasium. It is probably a fun and relatively safe vehicle to ride when articulating the foot levers up and down and moving forward in a straight line. It might not be as safe when turning though. Before a steep turn, the rider uses downward force on one of the footrests to articulate its opposing footrest into a safe "higher" position so that opposing footrest does not scrape the ground when turning. This is very similar to how a bicycle rider, just before tilting their vehicle and turning sharply, rotates one pedal to a safe higher position so it does not scrape the ground when they are in the turn, thus causing an overturn of the vehicle. When a bicycle pedal is in the higher position, it is a moderately-safe foot position for the rider to be in while turning sharply because both pedals stay flat so the rider's foot is in connection with them better than if the pedals tilted forward or backward too much of a degree. On this vehicle by Zike LLC, the footrests do not work like the pedals of a bicycle though, and this causes a safety problem. When the rider has articulated one of the footrest levers to a higher position to avoid it from scraping the ground in a sharp turn, that footrest points downwardly at a steep angle. This makes the foot on that footrest unstable and rather vulnerable to slipping off, thus causing a potential overturn of the vehicle. Furthermore, when a rider's foot is unstable on a footrest the rider loses the ability to apply the downward gravitational force that their body generates in a sharp turn to that footrest efficiently. Downward gravitational force on the footrests transfers through a vehicle's frame to the movement facilitators and creates traction with the vehicle and riding surface. A vehicle such as this one by Zike LLC would be safer to ride if it had footrests that did not tilt at such a large angle when turning sharply. Having a foot flat and stable on a footrest makes turning a vehicle at all speeds safer and more fun.

Pat. Nos. EP2465760A1 by Totex Design Ltd also describes a 2-wheel vehicle classified as a "bicycle without a seat." With this vehicle, the articulated footrests are also levers that the rider operates to generate forward propulsion. For safety, the rider can articulate a single footrest to a higher position before a steep turn so it does not scrape the ground too. Although, a footrest problem that could be more significant than the footrest problem with the Zike LLC vehicle then happens. When the rider articulates one footrest to a higher position to perform a steep turn, it tilts upward and backward and the opposing footrest tilts forward and downward so both of the rider's feet are rather vulnerable to slipping off the vehicle. Furthermore, the upward and backward-tilted footrests over-engage the rider's lower-leg calf muscles. It is best if the footrests stay relatively flat while in a turn, like foot pedals do on a bicycle. Over-engaging a calf muscle places an excessive amount of stress on the rider's lower leg and decreases the amount of downward force that they can generate through that muscle and apply to the movement facilitators of the vehicle through the footrests; thus, the vehicle and rider are less stable. A benefit of riding this vehicle is that the articulating footrests allow a person to adjust their mid and lower body weight and centrifugal forces to positions that help them stabilize their body and vehicle when turning sharply. Another benefit happens when the rider is gliding in a straight line and not operating the articulating footrest levers. They are standing with their feet a natural distance apart in a side-by-side position and relatively planar, flat to the level ground. The side-by-side foot stance is similar to how a person rides a Segway-style electric scooter. It is much safer and more comfortable than riding with one foot in front of the other "goofy foot" on vehicles with a single foot-platform or footrests that are too thin to stand on with your feet side-by-side. For "bicycles without a seat" side-by-side a natural distance apart is the safest and best footrest riding position because a rider can use their hips, legs, and feet to balance their body more accurately and efficiently than riding goofy foot. Nonetheless, when a vehicle rider is in motion, footrests should remain flat with their feet and not tilted forwards or backward.

In U.S. Pat. No. 6,220,612B1 by Trikke Tech Inc, also classified as a "bicycle without a seat", articulated footrests provide propulsion to a 3-wheel vehicle, but in a different manner than the previous 2-wheel articulating footrest vehicles. To propel a Trikke Tech vehicle forward, a rider tilts the vehicle sharply left or right and applies downward force with their leg to a single footrest in an outwardly motion. Once the vehicle begins moving forward, the rider tilts the vehicle in the opposite direction and shifts their outwardly leg muscle motion to the opposing leg and footrest so the vehicle continues moving forward in a sinusoidal wave-like path. This human-powered scooter with articulating footrests is a common recreational product for young children as well as an unusual means of transportation for both children and some adults too. Several inherent problems have always existed in this design though. One problem is that the vehicle does not propel forward in a straight line so the rider needs a lot of space to weave it left and right to go forward. Another issue with this vehicle is that the footrests are small and they are located too close to the elongated tubes that support them so the rider must angle the front of their foot outward and off the footrest to avoid it hitting the elongated tube, which is seen in FIG. 1 of the patent application referenced above. Both of these flaws in the design make the vehicle uncomfortable and less safe to ride for transportation or recreation purposes. To give their articulated footrest scooters some added market appeal, Trikke Tech Inc began selling their vehicles with snow skis as movement facilitators instead of wheels. In this design, the rider goes to a ski resort during winter months and uses downhill gravity for propulsion. Furthermore, Trikke Tech Inc now has a vehicle that uses an electric drive system to engage one of the wheels electrically, thus a rider no longer needs to weave their vehicle for propulsion and can travel in a straight line. Trikke Tech Inc has marketed and sold many of their vehicles mainly because they provide some entertainment. They remain an unpractical transportation and off-road recreational device though mainly because of the small footrests and wheels.

With the exception of the articulating footrest vehicle examples just referred to, common-everyday bicycles, and some vehicles not mentioned in the previous paragraphs, the majority of other footrest systems for vehicles are static and do not move up and down, forward and backward, or left and right. Vehicles with static footrests can be motorized, non-motorized, gravity, human, or animal powered, and typically have two wheels or skis mounted one in front of the other in an "inline" fashion to a frame and fork. Static footrests generally include a left and right foot peg, pedal, or platform. Some vehicles such as kid's scooters, both electric and human-powered, have a single static footrest platform or "floorboard." Many of these footrest platforms make a rider stand "goofy foot" because they are very thin in width, as discussed above. Standing goofy foot means to stand with one foot in front of the other, and not with your feet side-by-side. It is not a very safe way to stand on a floorboard when riding a scooter type vehicle. Although, some footrest platforms are wide enough that a rider can stand with their feet side-by-side, but not wide enough that the rider can stand comfortably and naturally with some open space in between their feet. One major problem with having conventional static footrests on a vehicle is psychological in that they are not suited for turning a vehicle sharply because many times the rider is afraid that a footrest will drag on the ground or in the snow and cause them to overturn the vehicle. Another major problem with static footrests is that they do not allow a rider of a vehicle with them to adjust their mid or lower body weight to positions that aid with balance and safety when turning sharply, such that articulating footrests do.

In many practices, the components of such conventional static footrests are fastened securely to the vehicles frame, as can be referenced in Pat. Nos. US20120074667A1 by Honda Motor Co Ltd. Although the footrests on this common motocross style motorcycle do pivot slightly upwards and backwards for safety related issues, neither footrest articulates up or down to a higher or lower position. Without articulating footrests, the rider of this seated motorcycle vehicle does not have the added benefit of being able to adjust their lower body weight to higher and lower positions to assist them in turning the vehicle.

With regards to adjustable footrest's on seated vehicles; inventor Nicolas Laberge: U.S. Ser. No. 11/148,751-B2, published Oct. 19, 2021, titled: ADJUSTABLE FOOTREST FOR A VEHICLE, teaches that wheeled straddle-seat vehicles (motorcycles) typically have footrests that are commonly in the form of foot pegs or floorboards: and are "rigidly" fixed to the vehicle frame. These would be the same style of typical or "traditional" motorcycle footrests that Bank discusses above. Laberge also suggests that these typical motorcycle footrests are "not adjustable" or "not adjustable enough" to allow for riders of different heights and sizes. In FIG. 3-7C, Laberge demonstrates a footrest system/assembly 200 connected to a rail mount 80 allowing adjustment of the assembly along the rail and a locked position. FIG. 13B shows a footrest in the adjustment and clamping position. In FIG. 13A, the footrest is in the locked position. The locked position sets the position of the assembly along the rail and allows the footrests to be adjusted forwards or backward or higher or lower before operating the vehicle. The Laberge invention suggests that the footrests are always in a locked position when the vehicle is in motion, and the rider never operates their vehicle when the footrests are unlocked. Although the Laberge footrests probably provide motorcycle riders more comfort when they are operating their vehicle, the invention has not solved the problem that is inherent with static footrests on motorcycles and similar types of vehicles. Footrests that a rider cannot articulate to higher and lower positions, like the pedals of a bicycle, are not helping the rider balance their body or steer the vehicle With their lower leg weight and muscles. If Laberge's invention had these important benefits, the motorcycle to which his invention is attached would be safer and more fun to ride.

To learn more about adjustable footrests for seated vehicles, we can view a patent application by inventor Jun Nakajima: U.S. Pat. No. 5,090,715-A, published Feb. 25, 1992, titled: MOVABLE STEP FOR MOTORCYCLE. Nakajima teaches a movable step or "footrest" for motorcycles, easily adjustable upwardly and downwardly, as well as forwardly and rearwardly, to provide optimum "comfort" to riders of different physiques, and under various travel conditions. Before operating the motorcycle, a rider adjust's their footrests to the desired position and they are locked in place. Once the vehicle is in motion, the footrests do not move forward or backward or up or down. In FIGS. 12-15, Nakajima demonstrates a footrest lifting mechanism that is similar to a scissor lift: a surface raised or lowered by the closing or opening of crossed supports pivoted like the two halves of a pair of scissors. Nakajima focuses on left and right footrests for vehicles that remain parallel to each other and are locked in a "fixed" position while the rider is in motion. Although his adjustable footrest invention does provide motorcycle riders with a much-needed footrest system that allows for various-size body types, it also appears to have some obvious problems. The invention looks very complicated and expensive to manufacture, doesn't appear streamlined visually, and it does not solve the problem of using static and fixed footrests on vehicles. When Nakajima's footrests are locked in place, it limits the rider from using their lower-body weight and muscles to help steer the vehicle while in a steep turn, such as a bicycle rider does with their leg weight and leg muscles. Adding bicycle cranks and pedals to a modern-day motorcycle would not be a good idea. But if Nakajima's footrests could articulate like bicycle pedals when the motorcycle with them is in motion and turning sharply, it could solve many of the problems that are inherent with static footrests on these types of vehicles.

While addressing static foot-peg inventions for vehicles, another patent application to reference would be U.S. Pat. No. 5,826,900-A, date of patent: Oct. 27, 1998, title: VEHICLE FOOT PEG. In this application, inventor Robert Steele provides a rearward-angling foot peg that may be attached to a motorcycle, ATV, or similar vehicle, and that allows the rider or the passenger to rest their feet in a position that is more comfortable than a conventional "non" rearward-angling foot peg. Steele says that his invention relates generally to foot pegs that provide for improved operator or passenger "comfort." To create this comfort, he angles the foot pegs rearwardly. Most motorcycle foot pegs generally rest outward at a ninety-degree angle from their frame mounting position. They do not bend forwards or backward, upwards or downwards. Adding "rider comfort" appears to be Steele's primary intention and focus with his invention too. But there is a problem with his overall idea and invention, and it is visible in FIG. 3. When a motorcyclist points their toes slightly outward it is called "duck feet," and it is considered an unsafe foot position to ride in because a rider has less control over their vehicle. This is commonly known among people that consistently ride motorcycles, ATVs, and other similar types of vehicles with footrests. Foot position when riding is very important too. Generally, the rider's feet, ankles, and toes should be pointing straight forward and in line with the vehicle. If feet and toes are sticking outward, as seen in FIG. 3 of Steele's patent application, they are more able to catch a stationary object on the ground, which could pull the rider's foot off the peg and cause a potential overturn of the vehicle. This is especially true for off-road motorcyclists when they are riding through a forest with thin trails and thick overgrown bushes, or the like. When learning about footrests for vehicles, it should be understood that the rider using them should always point their toes and feet straight forward and align them with the vehicle. A rider's feet and toes should never point outward unless their body is naturally formed that way. Whether using standard foot pegs, floorboards, or bicycle pedals a vehicle rider should not use Steele's duck feet philosophy to stand or rest their feet on their vehicle's footrests. It is not a good idea because this invention was not based on real data about correct foot-positioning on footrests for vehicles.

To further describe static footrests on vehicles, more particularly a "skibike" type vehicle, we can focus on U.S. Pat. No. 10,252,740-B2, dated: Apr. 9, 2019, and titled: SKI BIKE SYSTEMS AND DEVICES. Pierce demonstrates a skibike recreational device that is typically used at lift-serviced ski areas and moves along the snow using two skis and has the general form of a bicycle with handlebars and a seat. Pierce also says that there are two-basic skibike types: a traditional skibike that is called a "skibob" and a modern-day skibike that is called a "pegger." His application focuses on the pegger skibike though because they are the more popular of the two different types of skibikes. Currently, there are four to five companies throughout the United States who are making high-quality pegger "skibikes." The industry standard for footrests is no longer foot pegs though. It is BMX bicycle pedals that are fixed to the vehicle's frame. FIG. 1 in Pierce's application shows what a modern-day skibike looks like. FIG. 8 demonstrates a footrest system that most skibike riders use. Gliding a Type 2 skibike on the snow is fun and exciting, but there is a problem with the BMX pedal footrests. They are not the proper technology. Comparing skibike riding to bicycle riding will help explain this point. When a BMX or mountain bike rider is riding fast and turning sharply, they are generating gravitational and centrifugal forces that want to pull their body and vehicle outside of a turn. To avoid this accident from happening before or during the steep turn they rotate their pedals (lower leg weight) to align these gravitational and centrifugal forces with their body and vehicle's center of gravity: which in turn helps them steer the bicycle safer because better alignment generates more downward force that makes their tires grip the ground more efficiently. Thus, their bicycle is not sliding outside of the turn and they are not falling over. Staying upright and not having accidents always makes bicycle riding more fun too. A skibike with footrests that work similarly, but not the same, as bicycle pedals and cranks might be a better design than Pierce's. It could be more fun to ride than his skibike with static footrests.

U.S. Pat. Nos. D460,720S1 by Slopecycle LLC, also shows a snow-sliding vehicle, but it is without a seat to sit on and has a single static foot-platform or "floorboard" for both feet to rest on instead of two individual footrests. With this vehicle design, a rider straddles the frame with one foot on each side of the vehicle while standing on the floorboard. The footrests do not articulate during the entire time the rider is using their vehicle, so there are no benefits of being able to shift mid and lower body weight up and down to help steer the vehicle. This makes the vehicle less safe to ride and also more vulnerable to overturn.

This paragraph explains more detail about having articulating or static footrests on your vehicle. Many overturns and accidents on a vehicle with static footrests or a single footrest platform happen because the rider cannot move their footrests to upper and lower positions similar to how pedals and cranks on a bicycle work. Typically, when tilting into a turn a bicycle rider manually rotates the cranks with their legs and feet to raise their left pedal in the upward position for a left turn or right pedal in the upward position for a right turn. Raising the pedal higher off the ground makes turning a bicycle much safer because a rider is less likely to drag it in the dirt or on the pavement thus catching a stationary object and causing an overturn of the vehicle. Shifting the bicycle pedals to higher and lower positions during a steep turn also allows the bicycle rider to shift their centrifugal force to a more comfortable position where they can better use it to balance their bicycle. Furthermore, when a rider aligns their mid and lower body weight with the bicycle correctly during a sharp turn it helps convert centrifugal forces into gravitational "G" force that goes through the frame and makes the tires of the bicycle grab the ground or pavement better, thus adding safety and excitement to the ride. Learning how to do this correctly and efficiently is a skill that millions of bicycle riders strive to attain.

To explain with more specificity about vehicles with static footrests and the riders that use them, we can refer back to paragraph 0009 and the modern-day skibike in Pat. Nos. US2018/0086360A1 by Tngnt Skibikes Inc. Snowsport enthusiasts have enjoyed riding modern-day skibikes for recreational and sport purposes since the 1970's. Modern-day skibikes, also called "Type-2" skibikes, are very similar to a common mountain bicycle, but with two snow skis instead of two wheels and static foot-pegs or bicycle pedals as footrests. Typically, two snow skis are mounted to a frame and steering system in an inline fashion to facilitate movement of the skibike vehicle. To ride a skibike, a person goes to a ski resort during winter months, sits on a chairlift with their skibike in hand and rides to the top of the snow-covered mountain. After disembarking the chairlift, the rider points their skibike downhill, sits on the seat, steps onto a footrest with one foot and pushes the vehicle forward with the other foot to begin gliding downhill. To best simulate a snow skiing experience, sometimes the rider remains standing with both feet supported by the footrests. Skibike footrests comprise of either bicycle pedals, motorcycle style foot pegs or ATV style platforms secured directly into the front frame of the vehicle. It is important to mention that skibike footrests are static and do not move up or down, forward or backward and they do not help a skibike rider steer their vehicle with their mid or lower body weight such that pedals mounted on rotational cranks do for bicycle riders. As a result, the skibike rider is rather vulnerable to overturn their vehicle when negotiating a sharp curve. An overturn of the vehicle also happens when a footrest drags in the hard snow and catches a solid object under the snow that the rider did not see.

To help solve the problem of static footrests on a skibike, occasionally serious riders have customized their skibikes by replacing the fixed static footrests with rotational bicycle cranks, roller bearings and pedals. Functionally, this makes a skibike perform better than a traditional skibike because the rider can now raise and lower their footrests and adjust their lower body weight up and down in a steep turn. Skibikes with bicycle pedals and cranks are more fun to ride too because they perform more like a bicycle so the rider can experience higher G forces. Skibike riders that use bicycle pedals and cranks also get more exercise and look more stylish than traditional skibike riders that have their feet and legs resting on static footrests not getting exercise.

Bicycle cranks and pedals are not a solution to the problem of fixed footrests on a skibike though. Skibikes do not need rotational cranks because they do not have a drive train. The roller bearings allow the cranks to spin too freely, which makes them dangerous to use when riding a skibike. Furthermore, when riding the skibike elevated and in a straight line and both crank arms are in a planar and flat to the level ground position, one foot is in front of the other and that is not as safe as having your feet side-by-side. All these points make bicycle cranks and pedals the improper technology to fix the problem of static footrests on a skibike.

As is well known, most common motorcycle assemblies include a frame having foot pegs that a rider stands or rests their feet on while riding the vehicle. In most cases, foot pegs attach at the lower part of the vehicle's frame at opposite sides thereof. Frequently, controls for operating certain components of the motorcycle, such as a rear wheel brake or gear shifter, are located close to the foot pegs. Referencing to Pat. Nos. US20120074667A1 by Honda Motor Co Ltd, FIG. 12 in the patent application drawings depicts this scenario very accurately. Generally, foot levers allow the operator of the motorcycle to foot activate the engine's transmission gears and rear brake when desirable. A hand lever on the handlebar operates the transmission clutch. The conventional gasoline-powered motorcycle design has inherent disadvantages in that the foot-operated gear lever and the rear brake lever are in the pathway of a rider's foot when contemplating an articulating footrest design. With recent advancements in motorcycle designs that now use an electric motor to power the vehicle's movement, transmissions with gears are no longer necessary. This eliminates the need for a foot-operated gear lever near the foot peg and a hand-operated clutch lever on the handlebar. Furthermore, relocating the rear brake foot lever to the handlebar as a hand lever now frees up space at the foot-peg area for this articulating footrest invention to be applied thereof. Adding articulating footrests to all types of motorcycle riding will free many riders, especially riders with low-profile road racing motorcycles, from the fear that they might have of dragging a footrest along the ground, thus catching a crack in the road and causing an overturn of the vehicle. The biggest benefit of adding the present invention to motorcycle riding is that it will give riders the new ability to adjust their lower-body weight up and down and left and right to help them steer a motorcycle.

To give a good example of folding footrests for vehicles, one patent to highlight is U.S. Pat. No. 7,287,773-B1, title: FOLDING FLOOR BOARDS. Inventor Alwin Stahel's patent application relates to folding floorboards (footrests) used for supporting a motorcycle rider's feet, and that are arranged so that they will fold upwards from the horizontal usable position: thus minimizing the width of the motorcycle at the lower portion of the frame so rider's with shorter legs can reach the ground easier. Upward folding footrests that allow short people to straddle and stabilize their heavy motorcycle easier when stopped is a good idea. But there is a serious problem with the Stahel invention; the footrests cannot fold upwards because there isn't a power source that moves the floorboards from the flat position to the upright position. In his application, he does not disclose a power source to operate his mechanical invention. For a rider to operate his footrests invention manually with their feet in some way or another before bringing the motorcycle to a complete stop, would be rather inefficient and clumsy. A proper folding-floorboard invention for vehicles should have a power source and a method of engaging the power.

To describe footrests for vehicles that move upward and downward with the help of a mechanical assist device, we can view U.S. Pat. No. 9,469,361-B2, title: VEHICLE INCLUDING STEPS. In this application, inventor Yotaro Mori discloses a vehicle (2-wheel motorcycle) including steps (footrests) on which an occupant puts their feet. More particularly, he describes a vehicle including footrests and a hydraulically operated mechanism that changes the inclination of the footrests for comfortable driving and tandem traveling. Although this invention does seem to provide a motorcycle rider with a safer riding experience by moving a footrest upward and away from the riding surface while the vehicle is tilted in a sharp turn, a problem then happens at this same time that contradicts that benefit. This problem can be highlighted using two of Mori's drawings: although the depictions are not correct. The mistake is how we can highlight the problem. FIGS. 4B and 4C show the footrests inclining upward. But they do not show what happens to the rider's foot accurately. The inclined footrest surface 81A is not pressing sharply on the outer edge of the rider's foot and the inside of the foot is not lifted off of the footrest. To give a better and more truthful depiction of what happens when Yotaro Mori's invention is engaged upwards, the drawings should show the rider's lower leg and ankle too. Furthermore, a hydraulic-actuated folding steps invention should not move the rider's feet upward and away from the transmissions gear foot-lever and rear brake foot-lever because it then makes it harder for that rider to operate some of the vehicle's functions with their foot. Having a footrest for vehicles that moves upward and downward with a mechanical assist device (hydraulic or motorized) is a good idea, but the rider's foot should not lift off of the footrest when it is engaged. A rider's foot should remain flat and in connection with their footrest at all times to give them the best control of the vehicle possible.

While discussing problems with static footrests for traditional motorcycle-type vehicles, it is important to mention that newer electric-powered motorcycles have similar footrest problems too. Patent no. US-2020/0339210-A1, published Oct. 29, 2020, titled: ELECTRIC SADDLE TYPE VEHICLE, relates to a two-wheeled electric motorcycle with a saddle seat. In paragraph 0094 and FIG. 31, inventor Erik Buell demonstrates a left foot-peg mount and a right foot-peg mount that a motorcycle rider can stand or rest their feet on. Detailed descriptions and drawings throughout their application suggest that the foot pegs 85, 86 of their electric motorcycle invention do not move in any direction: upwards or downwards, or forwards or backward. They are traditional motorcycle foot pegs and they do not fold upwards to allow shorter riders to straddle their vehicle better, and they do not incline upwards to keep the foot peg from scraping the ground and causing a potential overturn of the vehicle. The footrests could articulate in some way or another when desired and when not. Although this invention addresses a crucial problem of providing an alternative-fuel-powered vehicle to environmentally-conscious motorcycle riders, it does not provide them with a new type of footrest that might be more fun to ride on than antiquated static footrests of the past.

To further describe footrests on modern-day electric motorcycles, we can reference a very recent U.S. Ser. No. 11/260,934-B2, date of patent: Mar. 1, 2022, titled: SWINGARM CONCENTRIC MOTOR DRIVE FOR ELECTRIC MOTORCYCLE. Inventor Samuel Nicholas Reitinger— assignee Harley Davidson, describes an electric-powered motorcycle having a rear wheel drivably coupled to the electric motor to propel the motorcycle, a swingarm rotatably supporting the rear wheel, and a frame. This is a new type of electric motorcycle that's relatively lightweight, making it maneuverable and fun to ride. In FIG. 4, left and right laterally extending foot pegs 50 are shown with a connector bar 78 attaching between the foot pegs and their assemblies. The foot pegs and their assembly attaches directly to the electric motor 58, and not to the vehicle's frame 28, 28A, 28B as is done on most motorcycles: gasoline or electric powered. Reitinger's foot pegs allow a rider to stand or rest their feet on them, and that is their primary function and purpose. Although static foot pegs such as these do help a motorcycle rider stabilize their upper body when in motion, the problem remains in that no matter how much downward leg force is applied to either foot peg the steering and handling characteristics of the vehicle do not change for the better. With a new lightweight motorcycle such as this electrically propelled one by Reitinger, the footrests should be designed better so that they allow the rider to somehow use them to help guide and steer the vehicle with their lower body weight and leg muscles. When both foot pegs remain fixed to the vehicle's frame, or in this case the electric motor, the rider's legs are also in a fixed position.

Accordingly, there is a continuing need for an articulating footrest invention that attaches to many different types of vehicles that are designed to be operated and ridden on smooth or rough roads or trails, and particularly designed for operation on hillsides and ski slopes, or in the water. The present invention fulfills this need and provides other related advantages.

SUMMARY OF THE INVENTION

The present invention resides in articulating footrests for vehicles similar to that of a bicycle, motorcycle, kids scooter or skibike. There are various purposes for this invention. One of which is to allow a person to have footrests on their vehicle that they can raise to a higher position, either manually or with an electric assist motor, so while turning sharply one of the footrests does not potentially drag on the riding surface. This helps to eliminate some of the initial fear people have when riding vehicles with footrests. Another purpose of the present invention is to provide a vehicle rider adjustable footrests that help him or her balance and stabilize their mid and/or lower body when turning sharply. This adds tremendous safety and fun to vehicle riding. Furthermore, this invention allows a vehicle rider to stand in a natural side-by-side position with open space in between their feet thus adding comfort, stability and more safety to vehicle riding. Furthermore, the present invention also adds exercise and stability to vehicle riding so a rider can enjoy their recreation and transportation better when compared to riding on a vehicle with static footrests, or other vehicles with articulating footrests that do not work that well.

This articulating footrest invention generally comprises an upper and lower horizontal arm having additional vertical footrest arms pivotally attached at the ends thereto. The upper and lower horizontal arms are adapted to freely rotate at center or midpoint by use of fulcrums. Footrests attach to the vertical footrest arms in different ways, which will be described in detail hereafter.

The articulating footrests for vehicles invention in this non-provisional application comprises of rigid arms, equal and non-equal distances and frictionless collinear pivots. In one particularly preferred embodiment, two similar horizontal arms are attached, one directly above the other, to a vertical column of a vehicle frame that is accompanied by various componentry and vehicle movement facilitators. We can call this articulating footrest configuration a "2-arm" version. A vertical footrest arm on each side of the vehicle attaches to the ends of the horizontal arms by means of frictionless pivots. The six attachment points of the 2-arm articulating footrest invention are pivots. Fixed to each vertical footrest arm is a footrest suitable for placing substantial weight thereon. Later described in this application is a "4-arm" articulating footrest version with twelve attachment points that are also pivots. It is important to mention that the 2-arm articulating footrest version is better for foot pegs, bicycle type pedals or small platforms and the 4-arm version is best for longer and wider foot platforms or "floorboards". Furthermore, the articulating footrest mechanism is not limited to the 2 or 4-arm versions. Any number of arms of any shape or size constructed from tubes, solid bars, plates, or a combination of these materials with or without spacers will suffice.

For maximum accuracy, the articulating footrest configuration requires that the top and bottom horizontal arm center fulcrums must be midpoint between the left and right vertical footrest arm pivots so that the weight of the vehicle rider will not result in a net transfer to either footrest. A fulcrum placed off center of the ideal center-pivot point of the top and bottom horizontal arm will tend to cause a net shift of weight in the direction of a downward-moving vertical footrest arm resulting in an imbalance of the articulating mechanism. Likewise, a fulcrum placed above the center pivot at midpoint will tend to level out the horizontal arms of the articulating mechanism's balance rather than it respond accurately and efficiently to small downward-force changes from the vehicle rider to the footrest.

The invention's center-pivot points attach to vertical flat mounts welded onto the apex of a round "tube" column or columns that support the mechanism on the vehicles front frame. These flat frame-mounts could also be loose spacers, but welding, braising or molding them onto a vehicles front frame for strength and rigidity is better. Mounting the invention to the flat surface of a square or rectangle frame tube with washers and/or spacers also works very well. Although a tube of any shape or size can work too. Methods for attaching the articulating footrest mechanism to the vehicles frame through its center-pivot points include a bolt and nut with washers and/or spacers, or a central-pivot point shaft secured to the vehicles frame that the horizontal arms can slide over and rotate about thereof. A nut or special screw would secure the footrest mechanism to the shafts. Securing the invention to a vehicle is not limited to these two methods though. Such connections can be made by any means that are known in the art such that the footrests can articulate in a generally vertical radial path. This articulating footrest invention is also not limited to a "vertical" frame-tube column for support. Other supports such as horizontal tubes or metal plates of any shape or size will suffice too. If either of the latter two methods of support for the articulating footrest mechanism are used, the top and bottom horizontal arm center fulcrums will also be inline with the vertical apex of the steering-system head tube of the front frame.

Typically, the center fulcrums on the horizontal arms are equal distance from the outer fulcrums that support the vertical footrest arm or arms on each side of the vehicle and on each end of the mechanism, unless footrest "tilt" is required. To provide a small degree of footrest tilt that adds some comfort and safety to riding the vehicle, the top horizontal arm may be a bit shorter than the arm below it. This idea works on both the 2 and 4-arm articulating footrest versions. To provide a vehicle rider a fast option to have footrest tilt, adjusting devices can be located on the ends of the horizontal or vertical footrest arms or a combination thereof.

Off-center weight on the left or right footrest exerts a downward force and a torque on horizontal arm center fulcrums and the frame supports of the articulating mechanism, thus causing the horizontal arms to rotate at midpoint. The center-pivot bearings on the top and bottom horizontal arm supported at midpoint carry the downward force. To save cost, plastic or similar-material sleeves with slipperiness inside metal sleeves welded or braised into the horizontal arms can replace the frictionless bearings of the invention. The invention could just use metal sleeves with grease and eliminate the need for the plastic slippery sleeves though, as long as the articulating mechanism rotates freely with little or no friction present.

Bolts, washers and nuts can secure the articulating footrest mechanism to the vehicle or nuts and washers on a shaft welded or braised onto the vehicle itself can work. Securing the articulating footrest mechanism together and to the vehicles front frame correctly is important because the frictionless connections of the horizontal and vertical footrest arms must tightly assemble without much play. If too much play exists in the connections and the offset weight of the vehicle rider rests toward the outside of the footrest, further from the center of the vehicle, the top arm will be in tension and the bottom arm will be in compression. This tension and compression while in use, if not removed by tight fitting fulcrums creates an off-balance of the footrests and makes the rider feel unsecure.

In this articulating footrest invention, certain presumptions are made. In order for such a device to be functional and be able to support physical masses, the following must be true:

1. All pivot points must move without producing large amounts of friction.
2. The lengths of the horizontal arms left and right of the center-pivot point fulcrums must be exactly equal, unless pedal tilt is required.
3. The horizontal arms must be exactly equal unless the weights of the arms themselves are required to be unequal.
4. The distance between the pivot points on the left vertical footrest arm must be the same as the pivot points of the right vertical footrest arm.
5. In order to support wider and longer footrest platforms or "floorboards" the articulating mechanism could be two sets of horizontal arms rotating at midpoint on the opposing sides of a single vertical frame column, or it could be two sets of horizontal arms rotating at midpoint on two separate vertical frame columns located in the footrest area of the vehicle frame.
6. The weight of the horizontal and vertical footrest arms on each side of the center fulcrums must be equal.
7. The horizontal and vertical footrest arms must be rigid and inflexible.
8. Gravitational force or rotational G force must be acting uniformly on the articulating footrest mechanism.
9. If any weight placed on a footrest is off-center then that footrest's tendency to tilt will cause the vertical footrest arm to exist in a state of tension and compression at the pivot points. This tension and compression will manifest as an increase in static friction.
10. The longer the horizontal arms generally, the more sensitive "stress" the mechanism will endure, though longer arms usually entail greater arm weight, which tends to decrease sensitivity and material stress.
11. Heavier footrests and vertical footrest arms also tend to decrease material stresses.
12. Sensitivity lost by increases in horizontal or vertical footrest arm size or weight or footrest weight or size can be counteracted with the use of an elastomeric rubber band system attached between the articulating mechanism and the vehicle frame to decrease static friction in the pivot points.
13. Helical tension springs can replace the elastomeric band system to counteract increased friction of the articulating footrest mechanism's bearings or material impact stresses while it is in use.
14. The upper and lower center-pivot points of the horizontal arms for both 2 & 4-arm versions are prevented from moving left or right, up or down and frontwards or backwards by the fulcrum itself
15. The articulating footrest mechanism described in this application depicts the footrests protruding outward from the center of each vertical footrest arm—this is so the footrest can have a center of gravity that is in the actual center of the parallelogram while the vehicle is in use. Adding evenly distributed weight to the footrests does not change that center of gravity and produces the result that a correctly built articulating footrest mechanism with well-fit and snug fulcrums balances in any arm position: so long as the mass of the riders weight on both sides of the vehicle is equal or the footrests are empty. The mechanism will balance with the right vertical footrest arm up and the left vertical footrest arm down, as well as the left vertical footrest arm up and the right vertical footrest arm down, as well as any position in between, and all of these positions will be "correctly balanced".
16. A footrest may be located on any part of the vertical footrest arm.
17. The vertical footrest arm or arms and footrest may be one piece. Each footrest and its vertical footrest arm or arms may have roller bearings that slip into or onto a flange or flanges on the end of a horizontal arm. The flange or flanges may be adjustable to provide footrest tilt.

A unique aspect of the present invention is that an optional elastomeric rubber band or helical torsion spring can attach between the articulating footrest mechanism and the vehicle's frame for purposes of aiding the rider in returning the mechanism's footrests to a planar and flat to the level ground position. When the articulating footrests are in use, the rubber band or the torsion spring stores energy that the rider can also use to aid him or her in returning the vehicle from a steep tilted turn to an upright elevated position. For this reason, an elastomeric rubber band or helical torsion spring with substantial energy storage is preferred for rough vehicle riding conditions, as on a dirt trail or a racecourse. A lighter weight elastomeric rubber band or helical torsion spring is preferred for easy street riding at slow speeds.

It is also contemplated that the articulating footrest mechanism can be operated automatically by an electric motor that responds to the tilting of the vehicle and not by the downward forces imparted on it by the rider of the vehicle. One or more of the horizontal arms could have an electric drive motor drive shaft attached to it in some way or another so it does not rotate freely and mostly by the electric motor rotating it in either direction. An electrical device attached to the vehicle that responds to tilting angles would send clockwise or counter-clockwise rotational commands to the electric motor so it rotates the footrests either up or down. For the "electric assist" articulating footrests to work correctly, when the rider tilts the vehicle left, the left footrest would raise to a higher position than it was when resting flat. When the rider tilts the vehicle right, the right footrest would raise to a higher position than it was when resting flat. "Resting flat" is when the vehicle is elevated vertically and it is the same distance from the ground to the bottom of each footrest. When resting flat, the footrests are relatively level with the ground.

Paragraphs 0029-0034 below highlight some basic vehicle embodiments for this inventions application.

A steering assembly is operably connected to the front-frame section of a vehicle that comprises the invention. Typically, the steering system includes a handlebar rotatably connected to the front-frame section.

A front movement facilitator, such as a wheel, snow or water ski member is operably connected to the steering assembly. The front movement facilitator is interfaceable with the riding surface to support the front-frame section and provide movement to the vehicle. Similarly, the rear-frame section has a movement facilitator operably connected thereto typically in the form of a wheel, snow or water ski or a track drive for snow or mud conditions. The front and rear movement facilitators are mounted one in front of the other and inline like the wheels of a standard 2-wheel bicycle, 2-wheel motorcycle, 2-wheel scooter or an inline roller skate that has more than two wheels.

The vehicle includes rider supports, typically footrests such as bicycle pedals, motorcycle type pegs or ATV style platforms attached to an articulating mechanism that is adapted to support a rider's weight thereon.

The frame can include stops extending from a frame section that engage with the articulating mechanism to limit the upward or downward movement of the footrests. These stops prevent the articulating mechanism from damaging the vehicle frame or its paintjob when the footrests are in use. The stops can also make the footrests more comfortable to use when shifting them up and down to the highest and lowest points of the articulations radial rotational movement. The stops preferably have shock dampening characteristics and may comprise of a resilient flexible-elastomeric material, but they are not limited to this material and can be made from other materials used in the vehicle manufacturing industries.

The vehicle could include stops on or inside the articulating mechanisms horizontal arms instead of on the vehicles frame. They would perform the same function and engage with the vehicle frame or a part of the frame thus limiting the upward or downward movement of the footrests. Preferably, these stops may be comprised of resilient flexible-elastomeric material and have shock dampening characteristics too.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings for purposes of illustration, the present invention resides in an articulating footrest invention, generally referred to by the reference number 40. The reference number 10 applies to a vehicle embodiment that could support the invention. As will be described more fully herein, the unique aspects of the present invention 40 is that the footrests articulate such that each moves in response to the application of the riders mid and lower body forces during operation of the vehicle 10 upon which the invention is attached.

Figure 1:
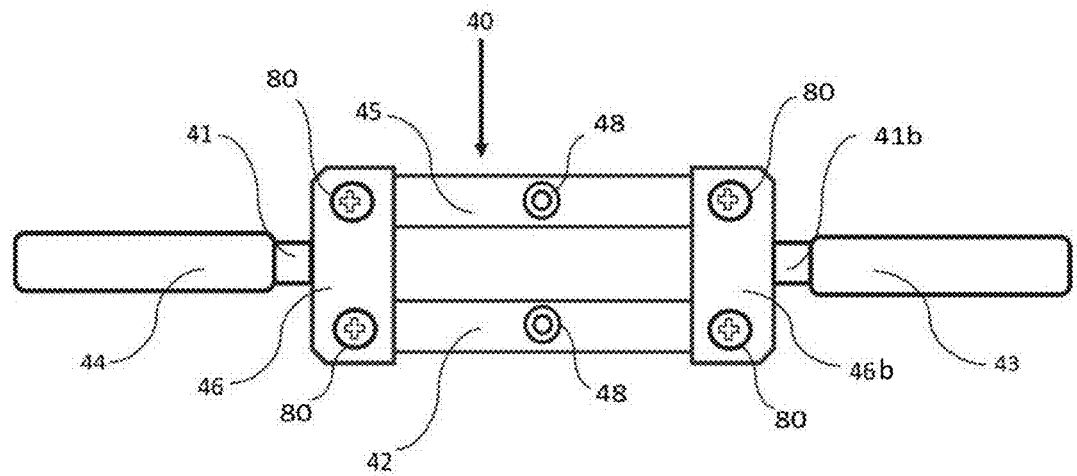
FIG. 1 is a 2-dimentional diagram of a front lateral view of the present invention of an articulating footrest invention for vehicles. This drawing depicts the footrests in a side-by-side "resting position" when each footrest on the elevated vehicle is equal distance from the ground.
Figure 4:
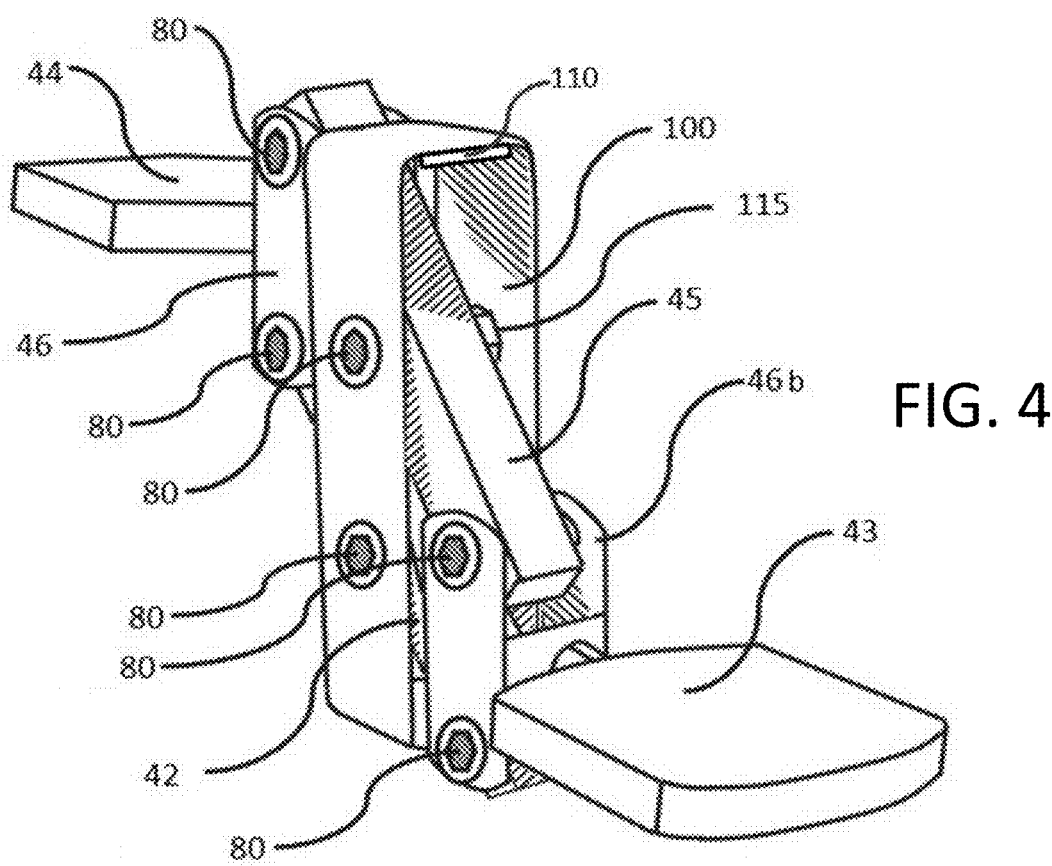
FIG. 4 is a 3-dimentional perspective view of the present invention mounted inside the optional support housing and footrests similar to bicycle pedals engaged in an up and down position.
Figure 7:
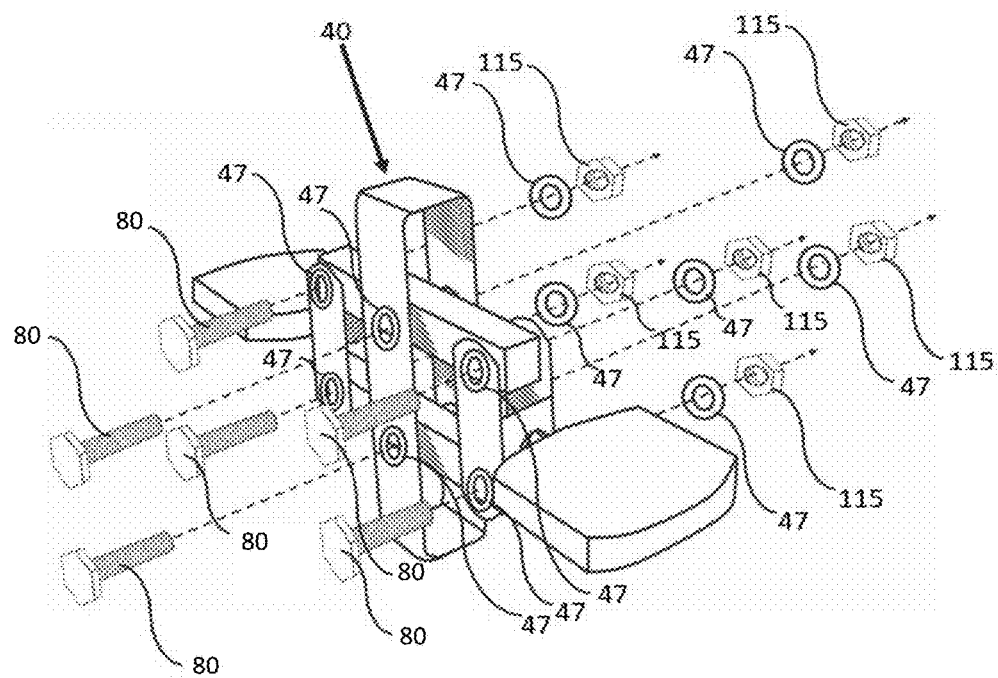
FIG. 7 is a 3-dimentional view of the articulating footrest mechanism with bicycle pedals parallel to one another. The pedal positioning demonstrates the rider's foot stance when they are riding along a generally straight line and not leaning the vehicle in a turn. Also depicted is an expanded view of the fasteners that connect the horizontal arms to the optional support housing and vertical footrest arms to the horizontal arms.

In a particularly preferred embodiment, with reference to FIGS. 1 and 2, two horizontal arms 42 and 45 rest above and below each other. Configured mid center of each arm 42 and 45, are pivot points such that a bearing or bearings 48 lubrication and the like may be implemented. FIG. 7 shows how bolts 80 insert through washers and/or spacers 47 and the pivot points of the invention. In the drawing, the two farthest left bolts 80 and 80 secure the invention 40 into the optional support housing and are the center-pivot points of the articulating footrest mechanism. If the optional support housing is not used, these two bolts could be longer and used to secure the invention directly to the vehicles front frame. For this configuration, FIG. 1 shows what the invention would look like. FIG. 4 shows how a nut 115 can help secure the articulating mechanism into the optional support housing or be used as a spacer to keep the horizontal arms centered within the optional support housing. Another method of securing the articulating footrest mechanism to the vehicles frame includes two or four shafts extending in an inline fashion from the front-frame and that sit relatively planar and flat to the level ground. Each shaft is configured to receive a bearing 48 or metal sleeve of the horizontal arms 42 and 45 there over such that the bearing or sleeve can rotate about the shaft. The metal sleeves are welded or braised or otherwise attached mid center of the horizontal arms 42 and 45. Lubrication and plastic polymer inserts may be implemented as necessary so that the horizontal arms can rotate more freely about the shafts, thus allowing the mechanism to articulate and the footrests to move up and down.

FIGS. 9-12, 14 and 15 demonstrate the articulating footrest mechanism 40 pivotally attached to a vehicles frame at the center pivots of each horizontal arm. Such connection can be made by any means that are known in the art such that arms 42 and 45 can pivot relative to one another in a generally vertical radial path. The horizontal arms 42 and 45 are generally parallel to one another when resting planar and flat to the level ground or articulated, as illustrated in FIGS. 1 and 2.

The horizontal arms 42 and 45 are comprised of metal tubing, bars, plates or any other material of any shape or size having sufficient strength and durability to support a human being thereon. Typically, the horizontal arms 42 and 45 are comprised of tubes, such as those used in motorcycles, bicycles, kid's scooters and the like. They can be any length that allows the rider of a vehicle a comfortable, safe and fun riding experience. FIGS. 1 and 2 shows how the horizontal arms 42 and 45 extend outwardly from their center pivot-points and connect to the vertical footrest arms 46 and 46b. FIGS. 2-4 shows an optional housing 100 for the horizontal arms to rotate inside of, which is also demonstrated in FIGS. 5 and 7. Welding, braising, bolting or molding the housing 100 to a front-frame section at footrest level makes producing a vehicle with the articulating footrest mechanism 40 simple and easy for vehicle manufacturing companies of all types and sizes. FIG. 1 shows that the housing 100 is not always necessary for the articulating footrest mechanism to work correctly because the center-pivot points of the horizontal arms can secure directly to a vehicles frame.

Figure 5:
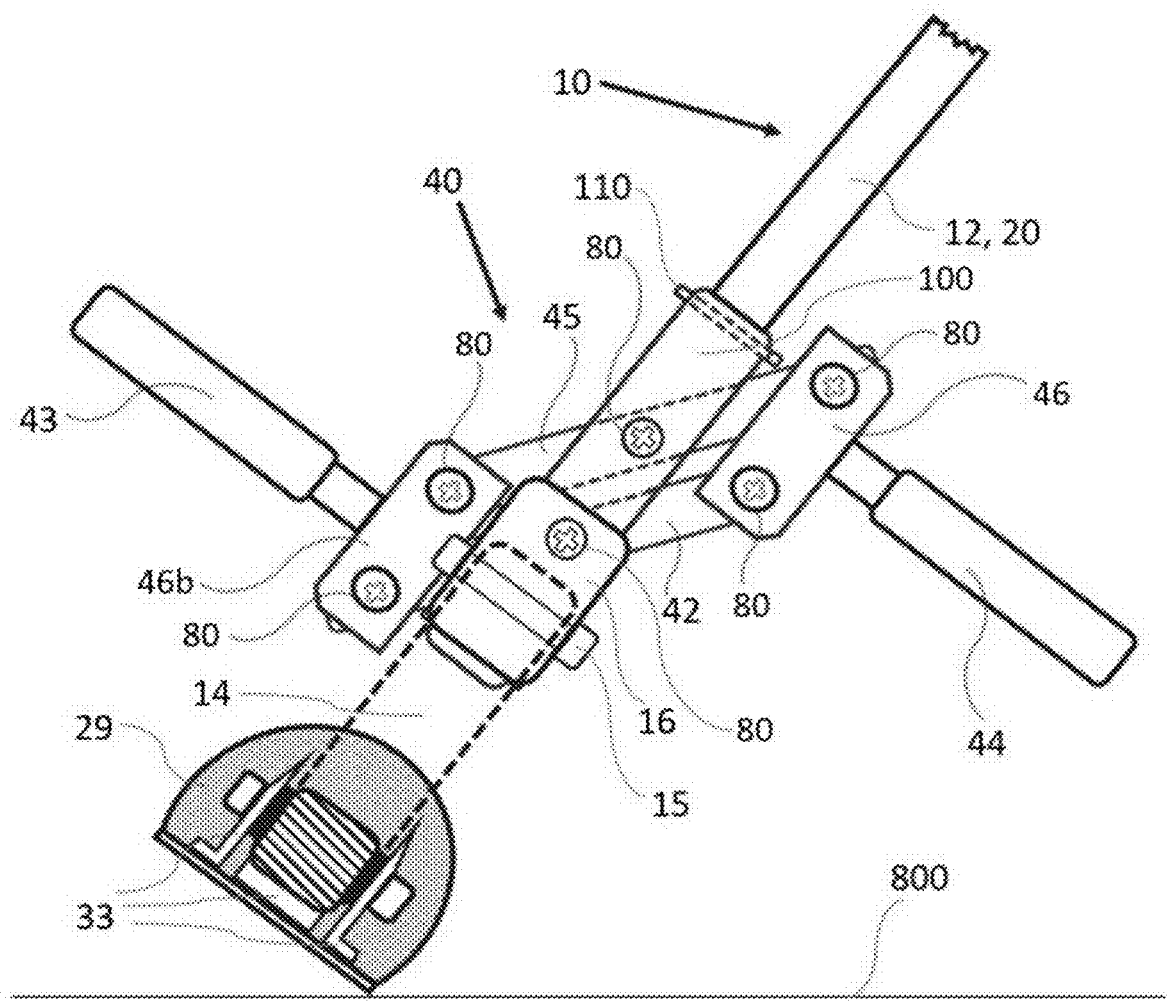
FIG. 5 is a 2-dimentional diagram and "rear looking frontward" fragmented lateral view of the present invention on a skibike vehicle turning sharply and tilted. A rear ski connects the ground snow and the right-foot footrest is in the highest articulated "up" position.

With reference to FIGS. 4 and 5, the vertical footrest arms 46 and 46b are pivotally attached to the ends of the two horizontal arms 42 and 45 so when downward forces are applied to the footrests 43 and 44, all the pivot points of the articulating mechanism rotate freely, as will be more fully discussed herein. The vertical footrest arms 46 and 46b are typically comprised of angled plates, tubing of any type or solid materials. Each vertical footrest arm is configured to accept a footrest 43 and 44 of some type. If bicycle pedals 43 and 44 are a preferred footrest, FIG. 2 demonstrates their axles 41 and 41b threaded into the vertical footrest arms 46 and 46b.

Figure 9:
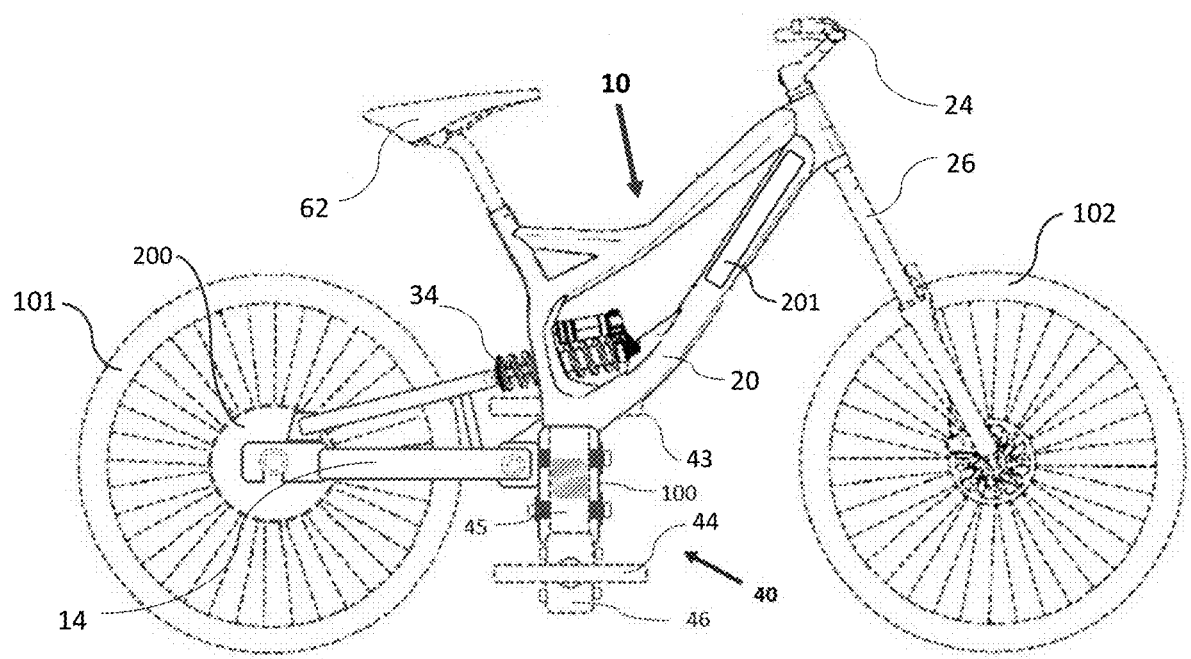
FIG. 9 is an elevated side view of a lightweight-electric motorcycle with the invention attached on the frame at footrest level.

The footrest supports 43 and 44 as seen in FIG. 4 consist of standard bicycle pedals adapted to support a rider's foot thereon. The bicycle pedal axles 41 and 41b typically and generally rest planar and flat to the level ground when the vehicle is elevated upwards and not tilted, as illustrated in FIG. 9, unless pedal tilt is required. Both pedal bodies spin about an axle by means of roller bearings, as on most bicycles. Footrests may also comprise of motorcycle type pegs or ATV style platforms that would secure to the vertical footrest arms 46 and 46b in the same location as the bicycle pedals just mentioned. The footrests can be located anywhere on the vertical footrest arms 46 and 46b, but mid center is a better location because it keeps the riders center of gravity in the center of the mechanisms 6 pivot points, which is illustrated very accurately in FIGS. 1 and 2. If bicycle pedals are not the preferred footrest, foot pegs strong enough to support a human being thereon may be secured to the vertical footrest arms 46 and 46b. Securing a footrest to a vertical footrest arm is possible by welding, screwing or bolting the two pieces together. A footrest shaft may also be secured to a vertical footrest arms 46 and 46b on which a bicycle pedal, motorcycle foot peg or ATV style foot platform would attach to in some way or another. Welding or braising any chosen footrests to the vertical footrest arms is a desired method of fastening the two pieces together too because there is less chance of good welds separating than having a threaded nut, bolt or shaft come loose. Welding bicycle pedals to the vertical footrest arms is not a good idea though because the bicycle industry produces a huge variety of standard bicycle-pedal options that could easily thread into the invention if matching threads are located on the vertical footrest arms in a female manner.

Figure 6:
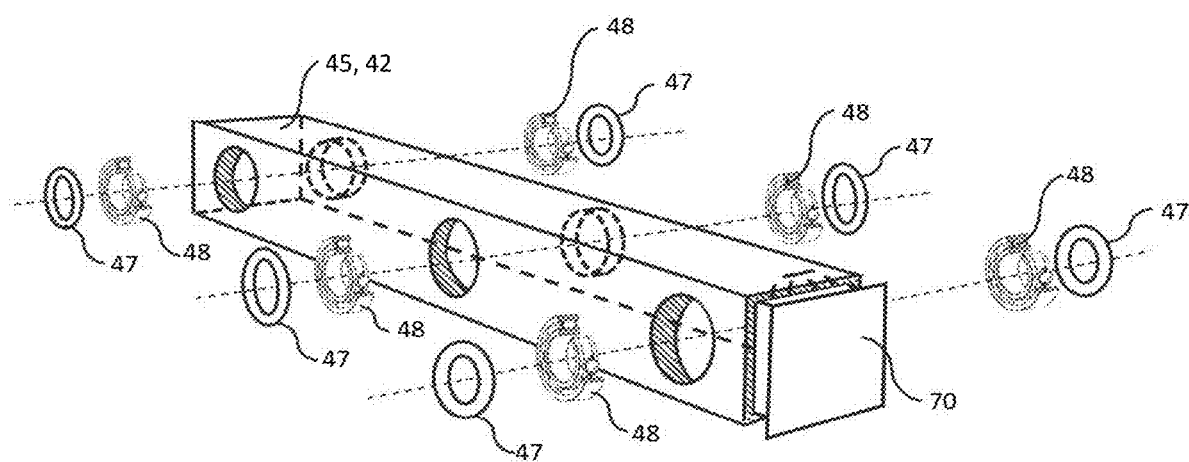
FIG. 6 is a 3-dimentional view of a single horizontal arm of the invention. Shown also are roller bearings and washers/spacers that help the footrest mechanism to rotate about its pivot points.

With reference to FIG. 7, the vertical footrest arms secure to the ends of the horizontal arms, which are pivot points, by means of a threaded bolts 80, washers and/or spacers 47 and nuts 115. Other types of fasteners such as screws with screw posts or barrels may be used to secure the vertical footrest arms to the horizontal arms. Whichever devices common in the art of fastening two or more pieces together are used though, it is important that the connections fit snug and well without much play. FIG. 6 shows roller bearings 48 that tightly insert into the lateral sides of the horizontal arms 42 and 45. A unique aspect of the invention is that the four outer pivot-point bearings or sleeves on the ends of the horizontal arms 42 and 45 may instead be located on the ends of the vertical footrest arms 46 and 46b. A different type of horizontal arm 42 or 45 with a flange or flanges with holes or slots on each end would allow this other type of vertical footrest arm with bearings or sleeves on its ends to attach to it. As mentioned above, FIG. 7 shows how a screw, bolt or pin of some type with washers or spacers 47 and a nut 115 can secure the pivot points of the articulating footrest mechanism together. A snow, dirt or water protection plug 70 that could be made of plastic or other similar type material would insert on the end of a horizontal arm, as seen in the illustration FIG. 6. Welding or braising a metal cap to the end of a horizontal arm is also a good method of sealing the tube from natural elements getting inside of it.

Figure 13:
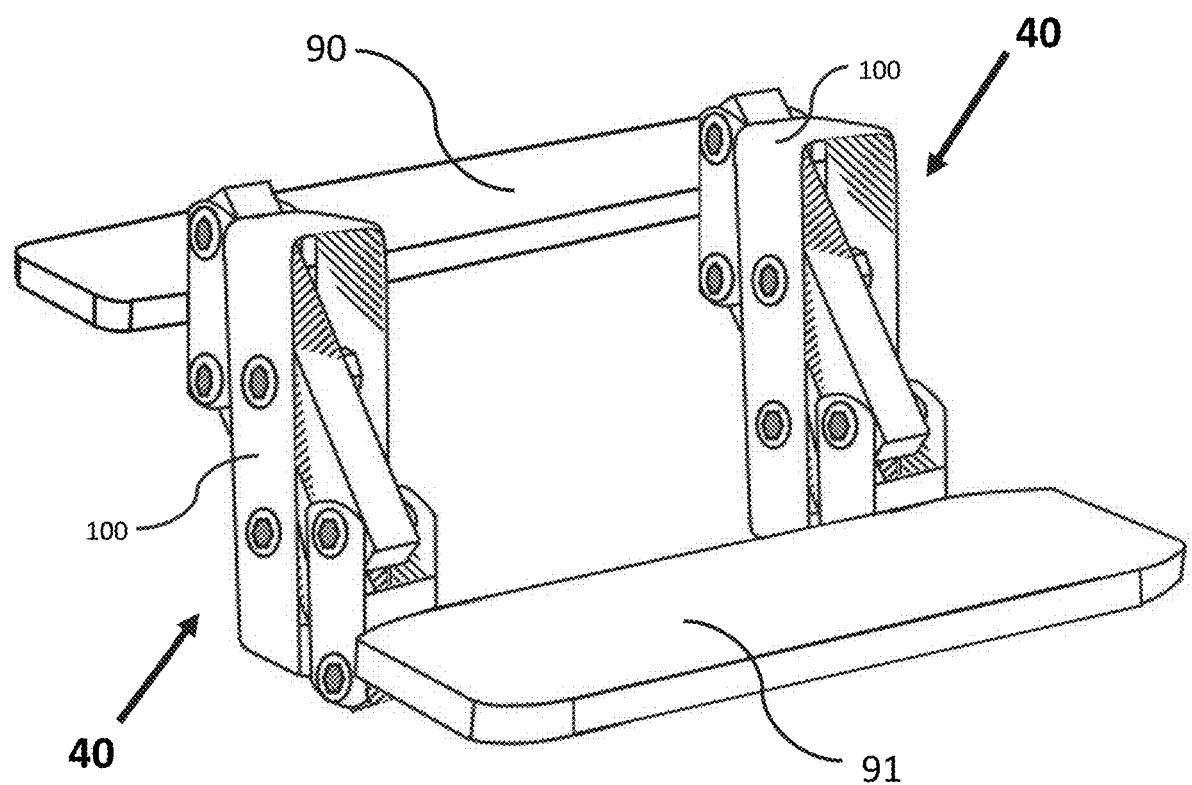
FIG. 13 is a 3-dimentional view of a 4-arm version of the articulating footrest invention with footrests in the up and down position. Two optional support housings are also illustrated.
Figure 14:
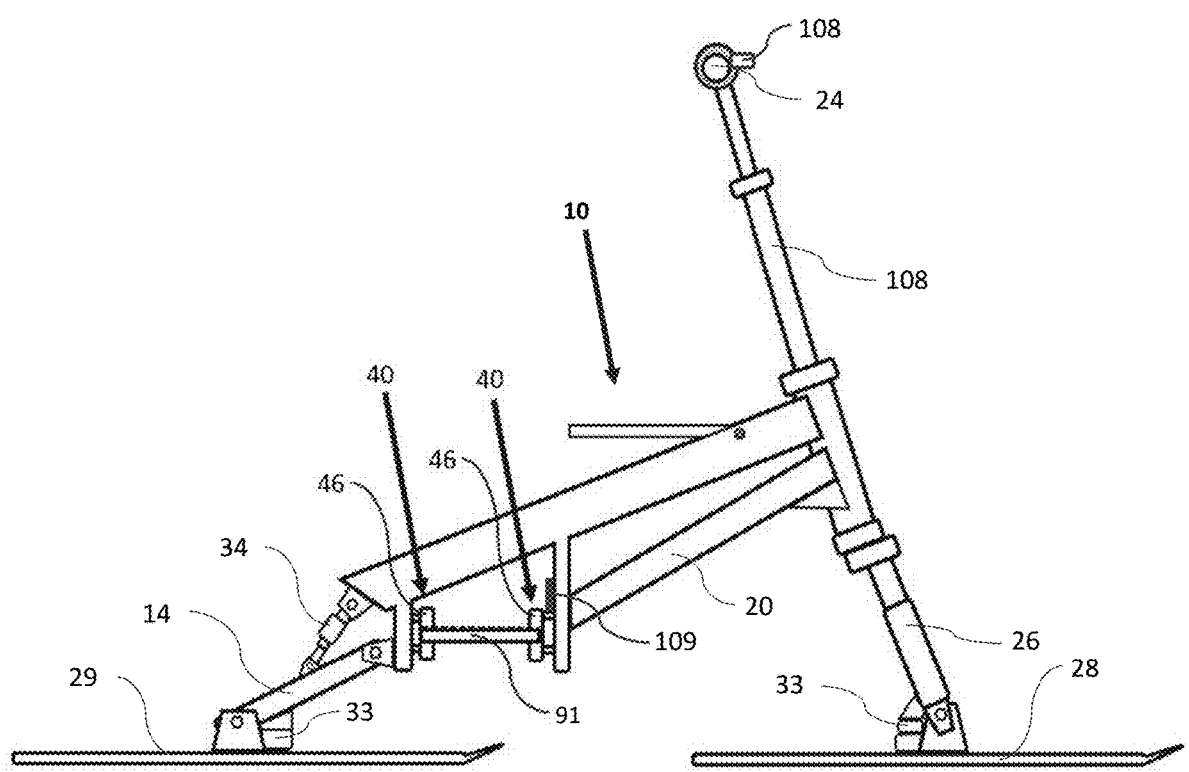
FIG. 14 is a right side elevated view of a gravity-propelled skibike vehicle without a seat and with the 4-arm version of the invention attached to the skibike frame in two different locations. In this drawing, the articulating footrest mechanisms are secured directly to the frame and the optional support housing is not necessary. Longer foot platforms or floorboards are also illustrated.
Figure 15:
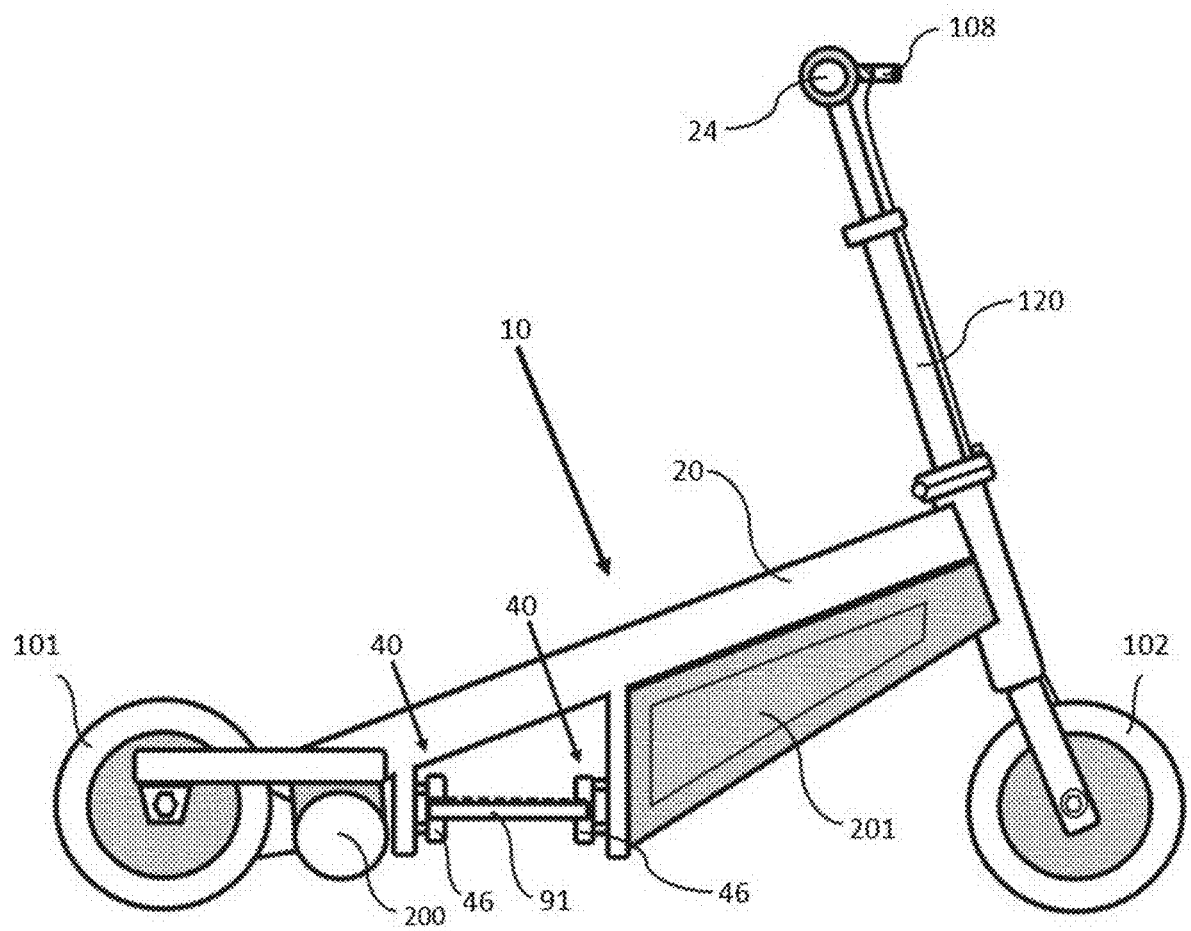
FIG. 15 is a right side elevated view of an electric-powered scooter vehicle without a seat and with the 4-arm version of the invention attached to the frame at footrest level. The invention secures directly to the frame in several locations and the optional support housings are not necessary.

With reference to FIGS. 13-15, footrests may also include larger foot platforms or floorboards 90 and 91 to accommodate riders with more stability at the base of their foot and enable them to more securely be positioned on their vehicle. To illustrate the 4-arm version of the articulating footrest invention FIGS. 13-15 shows how the present invention 40 and 40 may be located on a vehicle 10 in multiple locations and linked together with the footrests 90 and 91 and the vertical footrest arms 46 and 46b so both mechanism's 40 and 40 articulate in unison. This is done through welding, bolting, screwing or molding in some way or another each footrest 90 or 91 to their matching vertical footrest arms 46 or 46b. Welding, braising or molding a footrest 90 or 91 to its vertical footrest arms is a better method of securing the different pieces together because it provides a stronger bond so the footrest mechanism will articulate in unison more accurately. With reference to FIGS. 14 and 15, the present invention 40 is secured to the vehicles frame 20 in several places. Not shown in this particular embodiment are the optional support housings 100 and 100 because the invention 40 and 40 is secured directly onto two separate vertical columns of the vehicle's front frame 20. Paragraph 0023, #5 in the second part of the sentence explained this configuration. As just mentioned welding or molding a footrest to its matching vertical footrest arms then ensures the two separate articulating footrest mechanisms 40 and 40 articulate in unison. With reference to FIG. 13, two or more optional support housings 100 and 100 may be applied to a vehicle frame to create a 4-arm version of the articulating footrest mechanism 40 and 40. If a 4-arm articulating footrest mechanism is required, it is a preferred embodiment to have the mechanism attach directly to the frame without the optional support housing though, as seen in FIGS. 14 and 15. Although both styles of attaching the mechanism to the frame seem to work quite well.

Whether a 2 or 4-arm articulating footrest version attached to a vehicle, FIG. 14 shows that the present invention 40 and 40 may be locked in place by an optional device 109 located on the vehicle's frame and operated by a hand lever 108 on the handlebar 24. The lever that engages the articulating footrest-mechanism locking device 109 could also be a foot lever located on the vehicle frame or on the footrest itself. When activated, a handlebar lever 108 locks one or more of the horizontal arms 42 and 45 shut in a planar and flat level to the ground position so neither footrest can rotate. Footrests are in a side-by-side position as if riding in a straight line and not leaning the vehicle or articulating either footrest. This makes the vehicle 10 easier to learn how to operate so a first-time rider can get used to balancing their body on their vehicle first before unlocking the articulating footrest-mechanism locking device 109 and then using their mid and lower body weight to further balance and turn their vehicle. Locking the articulating footrest mechanism in a flat position is also beneficial to freestyle trick riders so when jumping their vehicle they will know where the footrests will be when landing. This locking device 109 can also be located on the articulating footrest mechanism and activated by a lever with a cable or hydraulic line located anywhere on the vehicle. Or, it could also be an electrically operated locking device 109 powered by a battery and activated by pushing a button located on the handlebars 24 or somewhere else on the vehicle. It seems to be a preferred embodiment to have the articulating footrest-mechanism locking device 109 located on the vehicles frame though. It is also contemplate that the locking device 109 when engaged can lock either footrest in its "lowest" or most downwardly articulated position so when the vehicle is at a full stop and tilted sideways a single footrest can act as a kickstand and the vehicle does not fall over and hit the ground.

Although several preferred embodiments of the present invention 40 have been described in detail for purposes of illustration, various modifications may be made without departing from the scope and spirit of the invention 40. Similarly, for purpose of illustrating the novel applications of the present invention, more details of the vehicle embodiments are provided below to further describe how the invention works. The invention is not limited to these vehicle embodiments though and other types of vehicles may suffice too.

Figure 10:
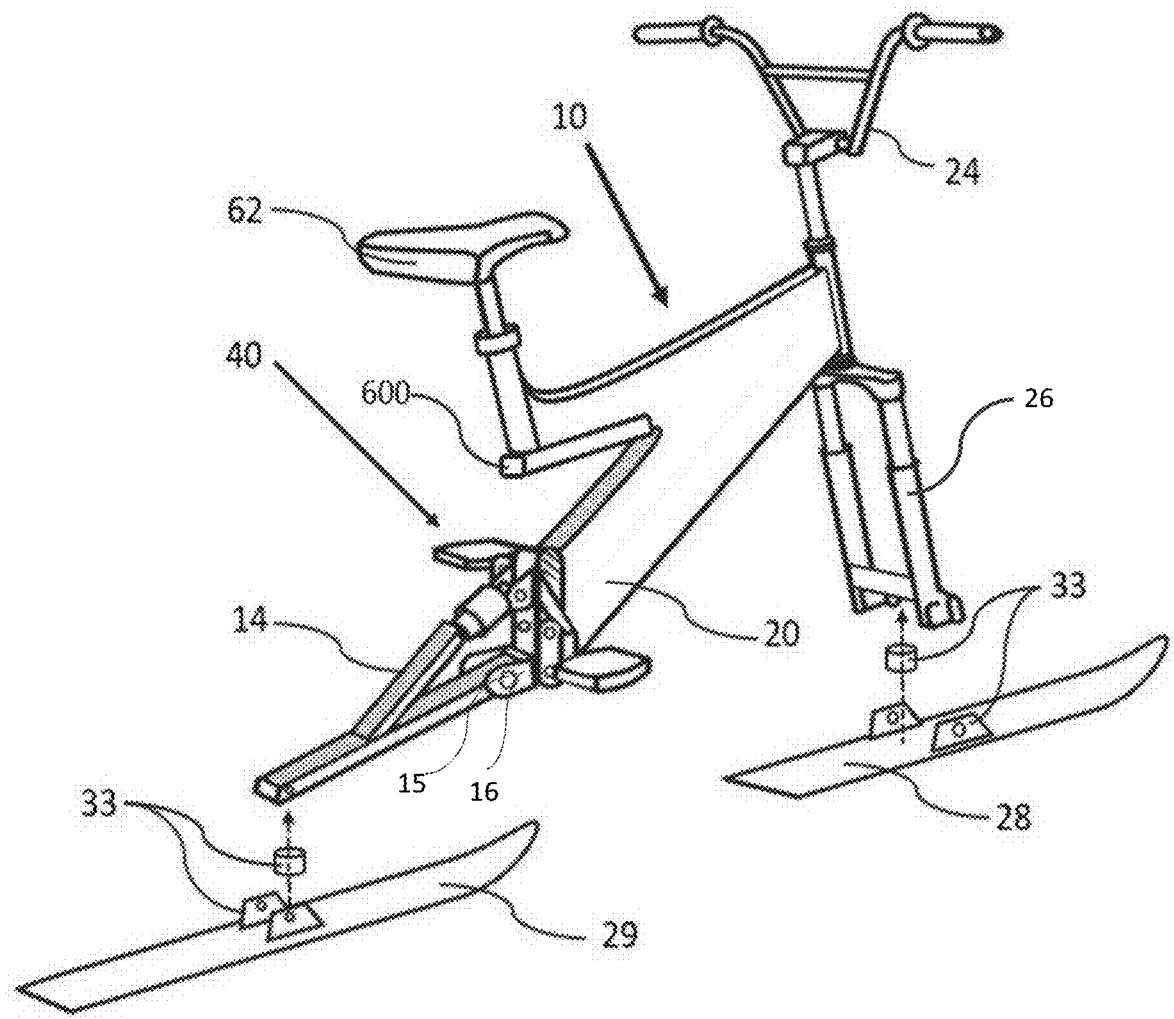
FIG. 10 is a rear/right side elevated view of a skibike with the present invention and optional support housing attached to the frame at footrest level.

With reference to FIGS. 9-12, and 14, the vehicle 10 includes a front frame section 20 and a rear frame section 14 which is pivotally attached to the front frame section 20 so as to independently articulate, as will be more fully discussed herein. The front frame section 20 is typically comprised of tubes similar to that which are used to manufacture a motorcycle, bicycle, kids scooter, skibike or the like. FIG. 10 demonstrates a modern approach by adding carbon fiber sheeting between the tubes of the front frame 20, which could also be done with aluminum or other lightweight sheeting materials. A vehicles front-frame section 20 may be comprised of a single "mono" tube or a framework of tubes having sufficient strength and durability to support a human being thereon, or it could be made entirely of carbon fiber or a similar space-age material. Typically, tubes such as those used in motorcycles and bicycles and the like are best for vehicle frame building. The front frame section 20 includes a steering system operably connected to a front movement facilitator, which serves to support the front frame section on a riding surface and provide movement to the vehicle. As illustrated in FIGS. 9-12, 14 and 15, these vehicle embodiments have the front frame section 20 including a handle bar 24 and fork assembly 26 rotatably attached thereto in conventional fashion using bearing and the like similar to what is used on a bicycle or motorcycle. FIG. 15 shows a stand-up scooter type vehicle 10 with two wheels 101 and 102, an electric motor 200, battery 201, and a longer steering column 120 that has an option to fold flat and parallel with the front-frame 20 so the vehicle is easier to load into a car trunk or in the back of a SUV. It is also contemplated that the electric motor 200 is located inside the hub of either the front wheel 102 or the rear wheel 101 or both wheels. FIG. 10 shows a skibike vehicle with a seat 62 and a snow ski 28 that rotatably attaches to the fork 26 with a ski-retention system 33 that also attaches to the fork and ski. The ski-retention system 33 limits the radial rotation of the ski so when a rider goes off a jump and is in the air the tip of the front ski 28 does not drop and dig into the snow when landing, thus causing a turnover of the vehicle. The fork 26 is preferably in the form of a shock-absorber fork or the like to provide dampening and reduce the forces applied to a rider's hands and arms.

With continuing reference to FIGS. 8-12 and 14, as discussed above, the rear frame section 14 is pivotally attached to the front frame section 20. Such connection can be made by any means that are known in the art such that the sections 14 and 20 can independently pivot and articulate relative to one another in a generally vertical radial path. A shock absorber 34 that attaches to the rear swing arm, also attaches to the front frame.

Figure 8:
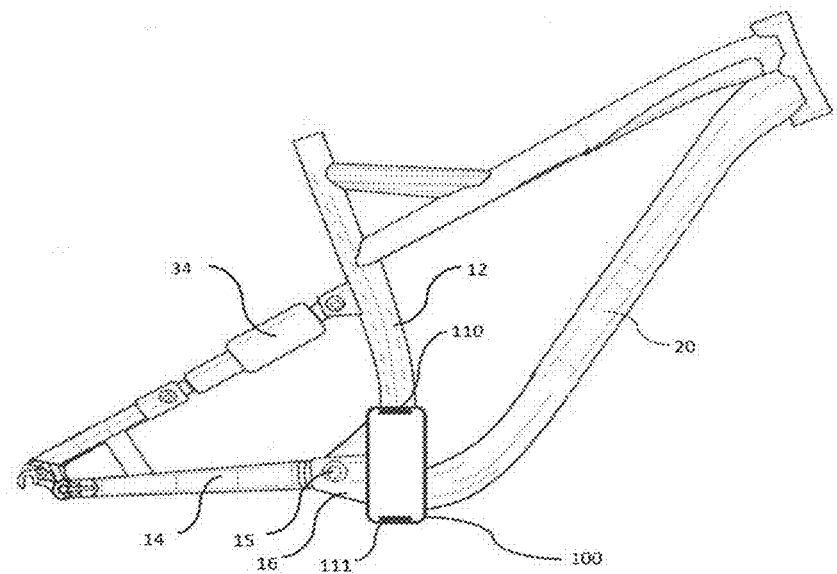
FIG. 8 is an elevated side view of a bicycle or lightweight-motorcycle frame with the optional support housing in the location where the articulating footrest invention inserts thereto.

FIGS. 8-12 and 14 also shows that the rear frame section 14 is comprised of a single tube or a framework of tubes having sufficient strength and durability to support a human being thereon. Typically, the rear frame section 14 is comprised of a tube or tubes, such as those used in motorcycles, bicycles, children's scooters, skibikes and the like. The rear frame section 14 extends at a generally downward angle from the pivotal connection 15 and 16, as best seen in FIG. 8.

Figure 12:
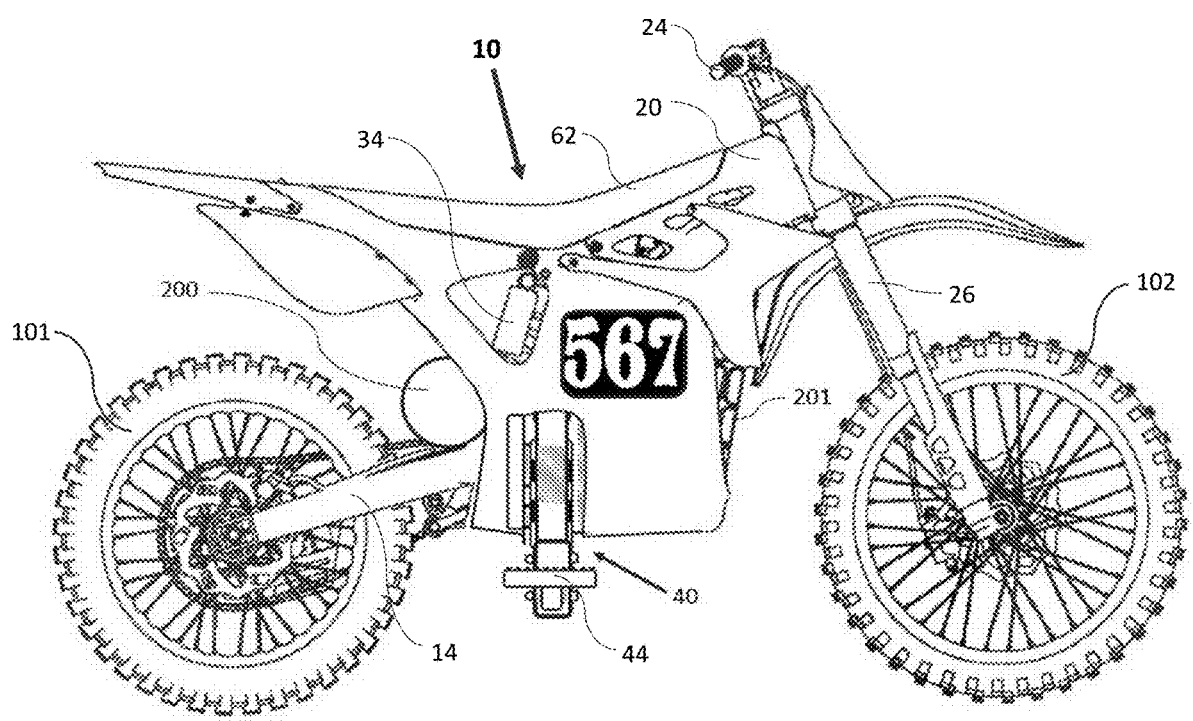
FIG. 12 is an elevated side view of a heavy-duty electric-powered motocross motorcycle with the invention attached to the vehicles frame at footrest level. The right footrest is articulated in the "down" position.

Referring to FIGS. 9, 10 and 12, a seat 62 attaches to the front frame section, such that the rider could sit down, place his or her feet on the footrests 43 and 44, grab the handlebar 24 and ride their vehicle while sitting.

A movement facilitator 29 in the form of a ski is operably connected to the rear frame section 14 which is interface able with the riding surface 800, as seen in FIG. 5, to support the rear frame section 14 and provide movement to the vehicle 10. A ski-retention system 33, similar to that of the front ski-retention system, limits the radial rotation of the rear ski and is located in between the rear-frame swing arm 14 and the rear ski 29. FIG. 5 depicts the right footrest 44 in the upward position and the vehicle frame seat-post tube 12 or front frame 20 leaned and tilted as if the vehicle were turning sharply.

As illustrated in FIGS. 9-12, 14 and 15, a particularly unique aspect of the invention is that the left and right footrest 43 and 44 or 90 and 91 articulate by use of two or more horizontal arms that pivot about bolts or shafts of some type attached to the vehicle frame 20 or the optional support housing 100. These pivoting points between the front-frame section 20 and the footrests 43 and 44 or 90 and 91 allow the rider of the vehicle 10 to lean his or her center of gravity to the left or right and up or down, as illustrated in FIG. 5. When turning sharply at a high speed, mid and lower-body weight generates G forces that a rider can shift and transfer to either footrest 43 and 44 and through the vehicles frame 12 and 20 to give extra downforce and traction to the front and rear 29 movement facilitators that are in the form of a wheel, ski or track. The human body movement that the invention 40 provides a rider is similar to that of the mid and lower-body leg movements of a downhill mountain-bike rider when they are standing on their pedals while in a steep turn. As the rider leans their vehicle left or right and applies downward force upon a single footrest the opposing footrest pivots upward and remains flat with the bottom of the rider's foot, which allows the riders foot to stay in contact with that opposing footrest. The articulating footrest mechanism 40 gives a vehicle rider options to place their footrests in a variety of preferred locations while they lean into a turn. This is unlike riding a vehicle with traditional static footrests that only have one position. As a result, the rider can use their feet, leg and hip muscles to cancel out unwanted centrifugal and G force exerted on their body and vehicle 10 when they are in motion and negotiating a sharp curve. Thus, the rider of the vehicle 10 can establish balance and remain inline with their center of gravity, which helps to prevent the overturning the vehicle 10. Also, as illustrated in FIGS. 9-12 and 14, when experiencing bumps, holes, or other irregular surfaces on a road, trail or snowy ski slope, the rear frame section 14 pivots in response to the rear wheel 101 or ski 29 coming into contact with such irregular surface. This causes the rear frame section 14 to move downwardly or upwardly in response, and helps to prevent the overturning of the vehicle 10.

Figure 2:
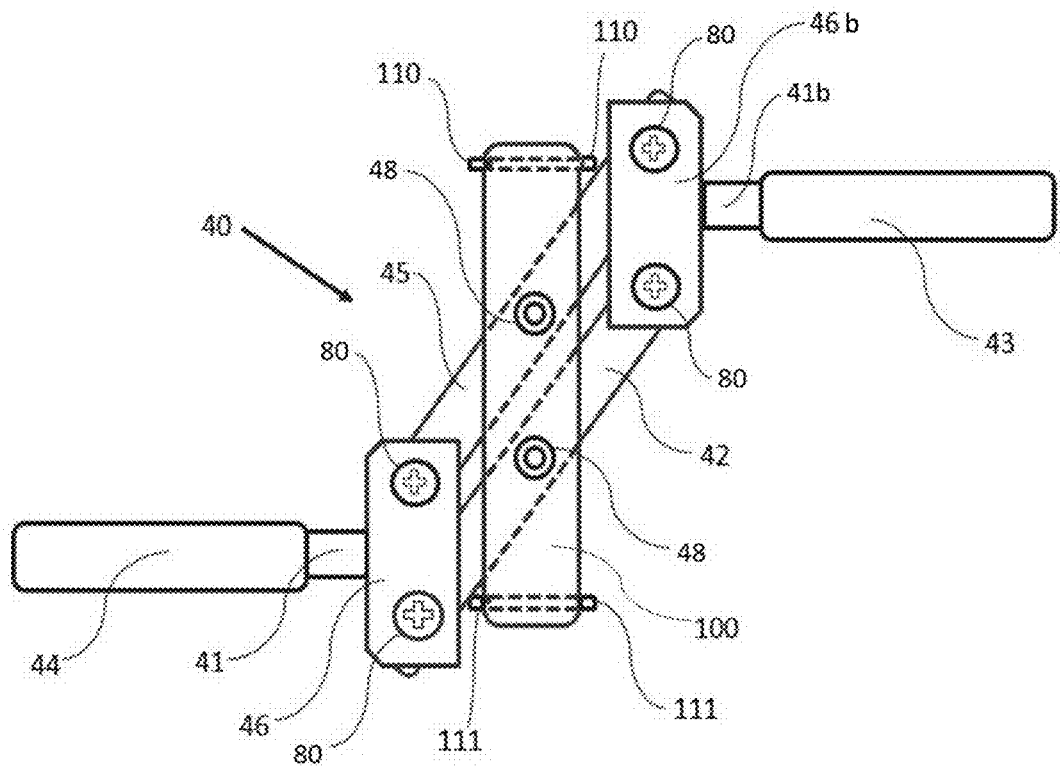
FIG. 2 is a 2-dimentional diagram of a front lateral view of the invention seen with the two footrests engaged in an up and down position. Included in this drawing is an optional support housing for the articulating footrest mechanism to rotate inside of and that could be included into or onto a vehicles frame design.
Figure 3:
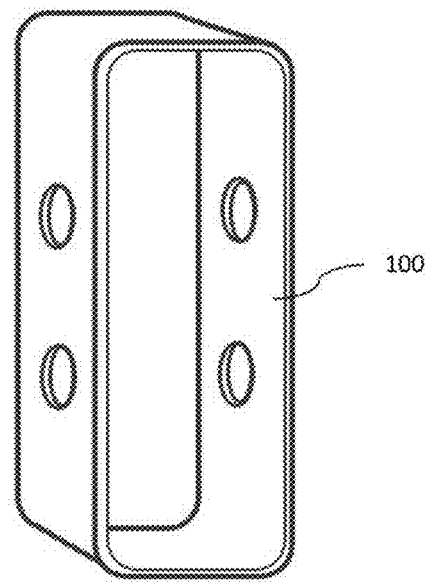
FIG. 3 is a 3-dimentional view of the optional support housing that is braised, welded, bolted or molded to a vehicle frame or a body part of the frame.

With reference to FIGS. 2 and 5, to limit the upward and downward travel of the articulating mechanism's horizontal arms 42 and 45, upper and lower stops 110 and 111 extend from the optional support housing 100 and are positioned such that the arms 42 and 45 come into contact with the respective stops. Preferably, the upper and lower stops 110 and 111 have shock absorbing and dampening qualities. It has been found that a particularly useful stop comprises an elastomeric material with durable but soft rubber qualities that can be compressed slightly due to the rider's weight and force applied thereto during operation of the vehicle 10, and lessen the force imparted to the rider of the vehicle 10. Of course, any shock or dampening mechanism can be implemented onto a vehicle to limit the upward or downward movement of the articulating footrest mechanism. The stops 110 and 111 may comprise shock-absorbing devices or materials such as those used on mountain bikes or motorcycles. Such shock absorbing devices or materials could include rubber, springs, compressed air, etc. so long as the upward and downward travel of the articulating mechanism's arms 42 and 45 is limited. Such stop mechanisms or materials could also be located on the articulating mechanism 40 instead of on the vehicles frame 20 or the optional support housing 100. The dampening device or material in any embodiment can be adjustable such that the rider would be able to adjust the dampening qualities.

Furthermore, adjusting the rigidity and rotational pivoting motion of the articulating footrest mechanism 40 can be done by incorporating helical torsion springs, elastomeric rubber bands, or similar return devices or materials between the articulating footrest mechanism 40 and its housing 100 or the vehicles frame 20. Being able to easily adjust these return devices or materials would accommodate for riding on different types of terrain, in which the footrests 43 and 44 or 90 and 91 would move very little when downward force is applied or a lot so a rider can more accurately retain control of the vehicle 10 on irregular surfaces. The ability to easily change these springs or elastomeric bands would enable the rider to quickly adjust the tension and other rotational qualities of the articulating footrest mechanism 40 so it returns faster or slower to a position that is planer and flat to the level ground or "resting position". If the correct tension spring or elastomeric band is attached between the articulating mechanism 40 and the vehicles frame 20 or the optional support housing 100, less downward force would be required by the rider to return the footrests 43 and 44 or 90 and 91 back to a planar and flat to the level ground resting position. Identifying the preferred elastomeric rubber band or helical torsion spring to match the type of terrain a person chooses to ride on can be part of the fun in customizing the articulating footrest mechanism to a rider's special needs and wants.

Typically, the combination of stops 110 and 111 and elastomeric bands or metal springs that return the articulating footrest mechanism 40 to a flat and planar "resting position" also serves to reduce the shock, force and strain exerted on the vehicle rider when they are operating their footrests at any speed. The upper and lower stops 110 and 111 and potential elastomeric return bands or springs both prevent the articulating footrest horizontal arms 42 and 45 from moving excessively, thus serving to stabilize the rider so they can have fun and excitement and not overturn their vehicle. With reference to FIG. 2, although the stops 110 and 111 illustrated in the drawing are of simple construction and relatively inexpensive, it will be appreciated by those skilled in the art that other shock dampening mechanisms and stops could be implemented into the present invention to satisfy the same needs.

The vehicle 10 preferably includes a brake system so the rider could adjust the overall speed of the vehicle 10.

Figure 11:
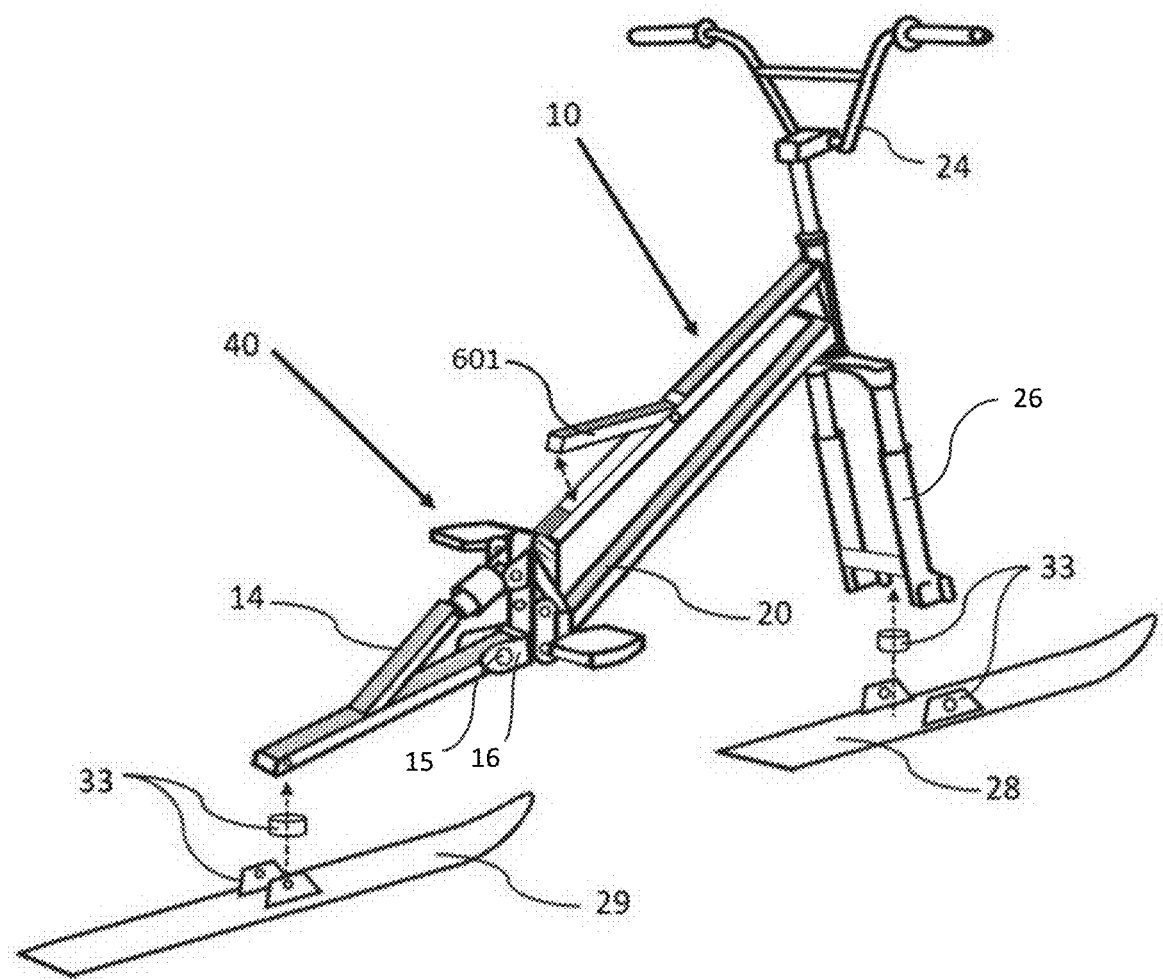
FIG. 11 is a rear/right side elevated view of a stand-up only skibike without a seat with the invention attached at footrest level.

FIGS. 11 and 14 show skibikes 10 without seats to sit on. Removing the upper section of the front frame 20 that supports a seat 62 and adding the articulating footrests invention 40 allows a skibike rider to shift their mid and lower body weight further left or right while turning thus copying the techniques and movements of a snow skier more accurately. The seated skibike vehicle 10 with the articulating footrests invention attached, as seen in FIG. 10, better provides an alternative winter amusement device for those who enjoy mountain biking during the summer when snow is not on the ground.

FIG. 10 demonstrates a skibike 10 with the articulating footrests invention 40, a seat 62 and a chairlift bar 600 located on the vehicles front frame. In this case, a rider would stand on the chairlift loading dock and straddle their vehicle 10 with both feet on the ground so the chairlift slides from behind them and into the space under the chairlift bar 600 to scoop both the rider and their vehicle up and off the ground and to the top of the mountain. FIGS. 11 and 14 both demonstrate a new style of stand-up only skibike 10 that this invention helps to inspire. A unique feature in this embodiment is that the chairlift bar 601 secures inside of the frames top tube so the chairlift bar 601 when lowered hides inside the frame tube. This feature is primarily for safety so a rider cannot encounter an impact of the bar during an overturn of the vehicle 10. Most importantly, the chairlift bars 600 and 601 on the seated skibike and the non-seated skibike render both vehicles convenient and relatively safe for chairlift transportation purposes.

With particular reference to FIGS. 9-12, 14 and 15, it is contemplated that other movement facilitators could also be implemented onto the vehicle 10, with the present invention 40, such as tracks used in snowmobiles or similar movement facilitators and which could be driven by and engine or electric motors and batteries or the like. In all instances, the pivoting arrangement of the articulating footrest mechanism 40 on the vehicle frame 20 would operate as described in detail above manually or automatically by electricity.

Although several vehicle embodiments have been described in detail for purposes of illustrating the present invention, various modifications may be made without departing from the scope and spirit of the articulating footrests mentioned throughout this patent application. Accordingly, the invention is not to be limited, except as by the appended claims.

What is claimed is:

1. Articulating footrests for vehicles, comprising:
    a top and bottom horizontal arm or two top and two bottom horizontal arms with fulcrums at midpoint and on each end that are for receiving flange or flanges of vertical footrest arms thereof; or
    a top and bottom horizontal arm or two top and two bottom horizontal arms with fulcrums at midpoint and flange or flanges on the ends for receiving fulcrums of the vertical footrest arms thereof;
    a set or two sets of bolts and nuts or shafts and nuts, both with washers and/or spacers, that connect either the 2 or 4-arm version of the articulating footrest mechanism to the vehicles front frame and that the horizontal arms rotate about thereof;
    left and right vertical footrest arms operably connected to the ends of the horizontal arms by means of washers and/or spacers, bolts and nuts or the like, inserted through a flange or flanges of the vertical footrest arms and the fulcrums at the ends of the horizontal arms; or
    left and right vertical footrest arms operably connected to the ends of the horizontal arms by means of washers and/or spacers, bolts and nuts or the like, inserted through fulcrums on the ends of the vertical footrest arms and a flange or flanges on the ends of the horizontal arms;
    a footrest such as a motorcycle peg, bicycle pedal or ATV platform for receiving the foot of a substantially weighted human being thereon that is connectable to the horizontal arms by means of vertical footrest arms or by the body of the footrest being molded in such a manner that the vertical footrest arms are not needed;
    an optional support housing that is attached to a vehicle front frame, or a part of the front frame in some way or another at footrest level, and that supports the articulating footrest mechanism;
    a method of connecting one or more elastomeric rubber bands from the vehicles front frame to the articulating mechanism;
    a method of connecting one or more helical torsion springs from the vehicles front frame, or a part of the front frame including the optional support housing, to the articulating footrest mechanism or a part of the mechanism;
    a method for connecting one or more optional electric motors from the vehicles front frame or a part of the front frame including the optional support housing to the articulating footrest mechanism;
    a method for connecting one or more optional electric motors from the articulating footrest mechanism to the vehicles front frame or a part of the front frame including the optional support housing;
    a method for receiving a part or parts of an optional locking device located on or in the vehicle frame that can lock the articulating mechanism so it does not rotate in any direction; and
    a method for delivering a part or parts of an optional locking device located on or in the articulating footrest mechanism into a receiver of said optional locking device part or parts so the footrests do not move up or down and are locked in place.

2. A vehicle, comprising:
a front frame section;
a steering assembly operably connected to the front frame section;
a front movement facilitator in the form of a wheel or ski operably connected to the steering assembly and interfaceable with a riding surface to support the front frame section on the riding surface and provide movement to the vehicle;
a handlebar rotatably connected to the front frame section and operably connected to the front movement facilitator;
a rear frame section pivotally attached to the front frame section and adapted to move along a vertical plane;
a shock absorber that connects to the rear frame section and that also connects to the front frame section;
a footrest on each side of the vehicle adapted to support a rider's foot thereon and that comprises of a motorcycle style foot peg, bicycle pedal or ATV platform operably connected to a mechanism of horizontal arms, vertical footrest arms, and no less than six attachment pivot points;
an optional support housing for the articulating footrest mechanism;
a rear movement facilitator in the form of a wheel, ski or track operably connected to the rear frame section and interfaceable with the riding surface to provide movement to the vehicle;
a brake system that slows or stops the vehicle; and
an electric drive system that engages at least one of the movement facilitators to provide movement to the vehicle.

3. The vehicle in claim 2, including a seat to sit on.

4. A vehicle, comprising:
a front frame section;
a steering assembly operably connected to the front frame section;
a front movement facilitator in the form of a ski operably connected to the steering assembly and interfaceable with a riding surface to support the front frame section on the riding surface and provide movement to the vehicle;
a rear frame section pivotally attached to the front frame section and adapted to move along a vertical plane;
a shock absorber that connects to the rear frame section and that also connects to the front frame section;
a handlebar rotatably connected to the front frame section and operably connected to the front movement facilitator;
a footrest on each side of the vehicle adapted to support a rider's foot thereon that comprises of a motorcycle style foot peg, bicycle pedal or ATV platform operably connected to a mechanism of horizontal arms, vertical footrest arms, and no less than six attachment pivot points;
an optional support housing for the articulating footrest mechanism;
a rear movement facilitator in the form of a ski operably connected to the rear frame section and interfaceable with the riding surface to provide movement to the vehicle; and
a chairlift bar located on or in the front frame that allows a chairlift at a ski resort to lift the vehicle up and off the ground and transport it up the mountainside.

5. The vehicle of claim 4, including a seat to sit on, a seat post that supports the seat, a seat post clamping device, and a front frame that allows for a seat post and a seat-post clamp and a space under the seat that a chairlift at a ski resort fits inside of.

6. The vehicle of claim 3, including upper and lower stops comprised of resiliently flexible elastomeric material with shock dampening characteristics extending from the front frame section and engage able with the top and bottom horizontal arms to limit rotational movement of the articulating footrest mechanism.

7. The vehicle of claim 3, including upper and lower stops comprised of resiliently flexible elastomeric material with shock dampening characteristics extending from the top and bottom horizontal arms and engage able with the front frame section to limit rotational movement of the articulating footrest mechanism.

8. The vehicle of claim 5, including upper and lower stops comprised of resiliently flexible elastomeric material with shock dampening characteristics extending from the front frame section and engage able with the top and bottom horizontal arms to limit rotational movement of the articulating footrest mechanism.

9. The vehicle of claim 5, including upper and lower stops comprised of resiliently flexible elastomeric material with shock dampening characteristics extending from the top and bottom horizontal arms and engage able with the front frame section to limit rotational movement of the articulating footrest mechanism.

10. The vehicle in claim 3, wherein an optional articulating footrest-mechanism locking device connects to the front frame and is engageable with at least one horizontal arm to limit or completely stop rotational movement thereof.

11. The vehicle in claim 5, wherein an optional articulating footrest-mechanism locking device connects to the front frame and is engageable with at least one horizontal arm to limit or completely stop rotational movement thereof.

12. The vehicle of claim 3, wherein one or more elastomeric bands that attach to the articulating footrest mechanism also attach to an optional support housing or the vehicles front frame so rotation of the horizontal arms stores potential energy in the elastomeric band for returning the footrests to a side-by-side resting position.

13. The vehicle in claim 3, wherein a helical torsion spring passes around a shaft or bolt on which the horizontal arm rotates and has end portion extensions that connect with the horizontal arm and an optional support housing or the vehicles front frame so rotation of the horizontal arm stores potential energy in the spring for returning the footrests to a side-by-side resting position.

14. The vehicle of claim 5, wherein one or more elastomeric bands that attach to the articulating footrest mechanism also attach to the optional support housing or the vehicles front frame so rotation of the horizontal arm stores potential energy in the elastomeric band for returning the footrests to a side-by-side resting position.

15. The vehicle in claim 5, wherein a helical torsion spring passes around a shaft or bolt on which the horizontal arm rotates and has end portion extensions that connect with the horizontal arm and the optional support housing or the vehicles front frame so rotation of the horizontal arm stores potential energy in the spring for returning the footrests to a side-by-side resting position.

16. The vehicle of claim 3, wherein one or more electric motors are located at midpoint of the horizontal arms and said electric motors drive-shaft extends outwardly to connect with an optional support housing or the vehicles front frame and when engaged electrically and automatically by means of a vehicle tilting response-device rotates the horizontal arms either clockwise or counter clockwise thus moving the footrests up and down in unison.

17. The vehicle of claim 3, wherein one or more electric motors are attached to the vehicles front frame or an optional support housing at footrest level and said electric motor drive shaft extends outwardly to connect with a horizontal arm at midpoint and when engaged electronically and automatically by means of a vehicle tilting response-device rotates the horizontal arms either clockwise or counter clockwise thus moving the footrests up and down in unison.

18. The vehicle of claim 5, wherein one or more electric motors are located at midpoint of the horizontal arms and said electric motor drive shaft extends outwardly to connect with an optional support housing or the vehicles front frame and when engaged electronically and automatically by means of a vehicle tilting response-device rotates the horizontal arms either clockwise or counter clockwise thus moving the footrests up and down in unison.

19. The vehicle of claim 5, wherein one or more electric motors are attached to the vehicles front frame or an optional support housing at footrest level and said electric motor drive shaft extends outwardly to connect with a horizontal arm at midpoint and when engaged electronically and automatically by means of a vehicle tilting response-device rotates the horizontal arms either clockwise or counter clockwise thus moving the footrests up and down in unison.

20. The vehicle of claim 2, wherein one or more electric motors are attached to the vehicles front frame or an optional support housing at footrest level and said electric motor drive shaft extends outwardly to connect with a horizontal arm at midpoint and when engaged electronically and automatically by means of a vehicle tilting response-device rotates the horizontal arms either clockwise or counter clockwise thus moving the footrests up and down in unison.

* * * * *